(12) United States Patent
Whiteside et al.

(10) Patent No.: US 10,356,071 B2
(45) Date of Patent: Jul. 16, 2019

(54) AUTOMATIC LOG-IN AND LOG-OUT OF A SESSION WITH SESSION SHARING

(71) Applicant: MCAFEE, INC., Santa Clara, CA (US)

(72) Inventors: Gregory Whiteside, Montreal (CA); Richard Bruno, St Albans, VT (US); Richard Reiner, Mississauga (CA)

(73) Assignee: McAfee, LLC, Santa Clara, CA (US)

( * ) Notice: Subject to any disclaimer, the term of this patent is extended or adjusted under 35 U.S.C. 154(b) by 126 days.

(21) Appl. No.: 15/126,226

(22) PCT Filed: Dec. 27, 2014

(86) PCT No.: PCT/US2014/072454
§ 371 (c)(1),
(2) Date: Sep. 14, 2016

(87) PCT Pub. No.: WO2015/160389
PCT Pub. Date: Oct. 22, 2015

(65) Prior Publication Data
US 2017/0093835 A1    Mar. 30, 2017

Related U.S. Application Data

(60) Provisional application No. 61/979,289, filed on Apr. 14, 2014.

(51) Int. Cl.
*G06F 7/04* (2006.01)
*H04L 9/32* (2006.01)
(Continued)

(52) U.S. Cl.
CPC ............ *H04L 63/08* (2013.01); *G06F 21/335* (2013.01); *H04L 63/0272* (2013.01);
(Continued)

(58) Field of Classification Search
CPC ... H04L 63/08; H04L 63/0272; H04L 9/3226; H04L 9/0863
(Continued)

(56) References Cited

U.S. PATENT DOCUMENTS 7,089,302 B1 *  8/2006  Churchyard ............ H04L 67/14
                                                    709/203
8,484,287 B2    7/2013  Gavini et al.
(Continued)

FOREIGN PATENT DOCUMENTS

JP    2004-103022 A    4/2004
JP    2005-122651 A    5/2005
(Continued)

OTHER PUBLICATIONS

International Searching Authority, "Search Report and Written Opinion," issued in connection with PCT patent application No. PCT/US2014/072454, dated Apr. 25, 2015, 10 pages.
(Continued)

*Primary Examiner* — Aravind K Moorthy
(74) *Attorney, Agent, or Firm* — Hanley, Flight and Zimmerman, LLC

(57) ABSTRACT

A technique allows for transparently managing, suspending, restoring, sharing, limiting and migrating user sessions on a device without having access to user credentials. A user may automatically log in and out of each or all their online accounts instantaneously and, in doing so, the user may share sessions without sharing passwords across client devices as well as with other authenticated and authorized users. Sharing may be done in a secure manner with the initiating-user being able to restrict shared session rights, as well as being able to remove access to each of the shared sessions.

21 Claims, 15 Drawing Sheets

(51) Int. Cl.
*G06F 21/00* (2013.01)
*H04L 29/06* (2006.01)
*G06F 21/33* (2013.01)
*H04L 29/08* (2006.01)
*H04L 9/08* (2006.01)

(52) U.S. Cl.
CPC .............. *H04L 67/02* (2013.01); *H04L 67/14* (2013.01); *H04L 67/42* (2013.01); *H04L 9/0863* (2013.01); *H04L 9/3226* (2013.01); *H04L 67/20* (2013.01)

(58) Field of Classification Search
USPC .................... 726/5, 4; 713/168, 171, 182
See application file for complete search history.

(56) References Cited

U.S. PATENT DOCUMENTS

| | | |
|---|---|---|
| 8,578,461 B2 | 11/2013 | Brown et al. |
| 8,656,154 B1 | 2/2014 | Kailash et al. |
| 8,661,495 B2 | 2/2014 | Reisman |
| 8,667,146 B2 | 3/2014 | Agarwal et al. |
| 8,667,575 B2 | 3/2014 | Thakur et al. |
| 8,856,869 B1* | 10/2014 | Brinskelle ............... H04L 63/08 726/12 |
| 8,898,746 B2* | 11/2014 | Gregg ..................... H04L 63/10 726/29 |
| 2003/0195963 A1* | 10/2003 | Song ................. G06F 17/30861 709/227 |
| 2004/0049673 A1 | 3/2004 | Song et al. |
| 2004/0143669 A1 | 7/2004 | Zhao |
| 2005/0066037 A1* | 3/2005 | Song ................. G06F 17/30861 709/227 |
| 2005/0204148 A1* | 9/2005 | Mayo .................. H04L 63/0815 713/185 |
| 2006/0026286 A1 | 2/2006 | Lei et al. |
| 2006/0136593 A1* | 6/2006 | Silky ....................... G06F 9/451 709/227 |
| 2006/0218629 A1 | 9/2006 | Pearson et al. |
| 2008/0016156 A1* | 1/2008 | Miceli ..................... G06Q 10/10 709/204 |
| 2008/0289029 A1* | 11/2008 | Kim ................. G06F 17/30905 726/12 |
| 2009/0141872 A1 | 6/2009 | Li et al. |
| 2009/0287824 A1* | 11/2009 | Fisher ..................... G06F 9/542 709/226 |
| 2010/0024015 A1* | 1/2010 | Hardt ..................... H04L 67/14 726/6 |
| 2010/0031153 A1* | 2/2010 | Ortwein .................. G06F 9/542 715/733 |
| 2010/0250756 A1* | 9/2010 | Morris .............. G06F 17/30899 709/228 |
| 2011/0296038 A1* | 12/2011 | Mandre ............. G06F 17/30899 709/228 |
| 2012/0197971 A1* | 8/2012 | Jiang ................. G06F 17/30899 709/203 |
| 2012/0198524 A1 | 8/2012 | Celebisoy |
| 2012/0204144 A1 | 8/2012 | Fioritoni et al. |
| 2012/0216124 A1* | 8/2012 | Martino ............. G06F 17/30884 715/739 |
| 2013/0318249 A1 | 11/2013 | McDonough et al. |
| 2014/0351175 A1* | 11/2014 | Venkat .................. H04W 4/028 706/11 |
| 2014/0359004 A1* | 12/2014 | Zhou ................... H04L 61/2575 709/203 |
| 2015/0193394 A1* | 7/2015 | Peters ................. G06F 17/2247 715/234 |
| 2015/0373096 A1* | 12/2015 | Chandrasekaran ... H04W 4/023 709/226 |

FOREIGN PATENT DOCUMENTS

| | | |
|---|---|---|
| JP | 2011-227816 A | 11/2011 |
| JP | 2012-155672 A | 8/2012 |

OTHER PUBLICATIONS

Chinese Patent Office, "Notification of the First Office action," issued in connection with Chinese patent application No. 201480077216.6, dated Sep. 19, 2018, 13 pages.

European Patent Office, "Extended Search Report," issued in connection with European Patent application No. 14889312.6, dated Oct. 5, 2017, 9 pages.

European Patent Office, "Communication pursuant to Rules 70(2) and 70a(2) EPC," issued in connection with European Patent application No. 14889312.6, dated Oct. 24, 2017, 1 pages.

Japanese Patent Office, "Decision to Grant," issued in connection with Japanese patent application No. 2016-556843, dated May 30, 2018, 1 page. English Translation not available.

Japanese Patent Office, "Notification of Reasons for Refusal," issued in connection with Japanese patent application No. 2016-556843, dated Oct. 10, 2017, 3 page.

Korean Patent Office, "Preliminary Rejection," issued in connection with Korean patent application No. 2016-7025351, dated Apr. 3, 2018, 8 pages.

European Patent Office, "Intention to Grant," issued in connection with European patent application No. 14889312.6, dated Mar. 8, 2019, 59 pages.

Chinese Patent Office, "Notice of the Second Office action," issued in connection with Chinese Patent application No. 201480077216.6, dated Mar. 22, 2019, 7 pages.

* cited by examiner

AUTOMATIC LOG-IN AND LOG-OUT OF A SESSION WITH SESSION SHARING

CROSS-REFERENCE TO RELATED APPLICATIONS

This application claims priority to U.S. Provisional Application Ser. No. 61/979,289 entitled "Transparent management, suspension, restoration, sharing, limiting and migration of user sessions without access to user credentials" filed Apr. 14, 2014, which is incorporated by reference in its entirety herein.

TECHNICAL FIELD

The invention generally relates to methods and processes to allow a user to securely share sessions without sharing passwords across client devices as well as with other authenticated and authorized users.

BACKGROUND ART

Users who want to log out of an application or website typically require, at the least, a username and password. Also users may have more than one account per application. For an authenticated user to access their applications, websites and data, they usually adopt substantially similar means for most if not all their accounts. Also, if users desire to share sessions with other devices and/or users they need to do this by sharing, at the very least, the relevant usernames and passwords. This results in systems' insecurities and a means for identity fraud. Today, evermore, websites and applications are insisting on the use of stronger usernames and passwords as well as layers of information and interaction before allowing access to, one or another part of, their application and data by the a user. This becomes a hindrance to having one or more sessions opened on multiple devices or having sessions shared amongst multiple users under standard network connections. Also, websites and applications change their logging methods and processes from time-to-time to assure that only credible human users are allowed access. This makes access and retrieval secure but frustrating, not only for the initiating-user, the so called master, but even more so for those devices and third party users that are allowed to share a session securely with the master-user and his or her initiating-device.

Once any device and/or user is properly authenticated, the system need protect against undesired intrusion and manipulation whilst assuring that legitimate users can seamlessly access applications and data. Various methods and processes have been proposed to address these problems.

U.S. Pat. No. 8,484,287, entitled "Systems and methods for cookie proxy jar management across cores in a multi-core system", discloses systems and methods for managing cookies by a multi-core device. The device is intermediary to a client and one or more servers. A first core of a multi-core device receives a response from a server to a request of the client through a user session. The response comprises a cookie. The first core removes the cookie from the response and stores the cookie in a corresponding storage for the session. The first core forwards the response without the cookie to the client. A second core then receives via a session, a second request from the client. The second core determines the identification of the first core as owner of the session from the second request. The second core then communicates to the first core a third request for cookie information for the session.

U.S. Pat. No. 8,667,575, entitled "Systems and methods for AAA-traffic management information sharing across cores in a multi-core system", discloses methods for propagating authentication session information to a plurality of cores of a multi-core device includes establishing, by an authentication virtual server executing on a first core of a device intermediary to at least one client and server, a session for a user, the authentication virtual server authenticating the session. A traffic management virtual server executes on a second core of device, and receives a request to access a server via the session. The traffic management virtual server may identify, responsive to a determination that the session is not stored by the second core, from an identifier of the session that the first core established the session. The second core may send to the first core a request for data for the session identified by the identifier. The second core may receive from the first core a response to the second request identifying whether the session is valid.

U.S. Pat. No. 8,656,154, entitled "Cloud based service logout using cryptographic challenge response", discloses a cloud based service use may be logged into the service through multiple client devices simultaneously. Methods, systems and computer program products based upon cryptographic challenge response are provided to efficiently and securely simultaneously effect a logout from the cloud based service at one or many logged-in client devices associated with the user. When a valid logout request is received by the cloud based service, a current key associated with the user is invalidated, and in some instances, replaced with a new key. Upon subsequent attempts to use the cloud based service by the user, one or more tokens residing on any previously logged-in client device associated the user will not allow cloud based service usage until the user validly logs into the cloud-based service and receives one or more new tokens based upon the new key at each client device.

U.S. Pat. No. 8,578,461, entitled "Authenticating an auxiliary device from a portable electronic device", discloses a method for authenticating a browser executing on an auxiliary device with a web service executing on a portable electronic device. The method includes receiving a request for a resource from the browser, determining whether the request identifies a protected resource, and selectively authenticating the request based on whether the request identifies a protected resource.

U.S. Pat. No. 8,667,146, entitled "Systems and methods for configuration driven rewrite of SSL VPN clientless sessions", discloses solutions for an enterprise providing services to a variety of clients to enable the client to use the resources provided by the enterprise by modifying URLs received and the URLs from the responses from the servers to the client's requests before forwarding the requests and the responses to the intended destinations. An intermediary may identify an access profile for a clients' request to access a server via a clientless SSL VPN session. The intermediary may detect one or more URLs in content served by the server in response to the request using one or more regular expressions of the access profile. The intermediary may rewrite or modify, responsive to detecting, the one or more detected URLs in accordance with a URL transformation specified by one or more rewrite policies of the access profile. The response with modified URLs may be forwarded to the client.

U.S. Pat. No. 8,661,495, entitled "Methods and apparatus for browsing using alternative linkbases", discloses systems and methods for navigating hypermedia using multiple coordinated input/output device sets. Disclosed systems and methods allow a user and/or an author to control what resources are presented on which device sets (whether they are integrated or not), and provide for coordinating browsing activities to enable such a user interface to be employed across multiple independent systems. Disclosed systems and methods also support new and enriched aspects and applications of hypermedia browsing and related business activities.

However, there is a need for methods and processes for transparently managing, suspending, restoring, sharing, limiting and migrating user sessions on a device without having access to user credentials.

DESCRIPTION OF EMBODIMENTS

Figure 1:
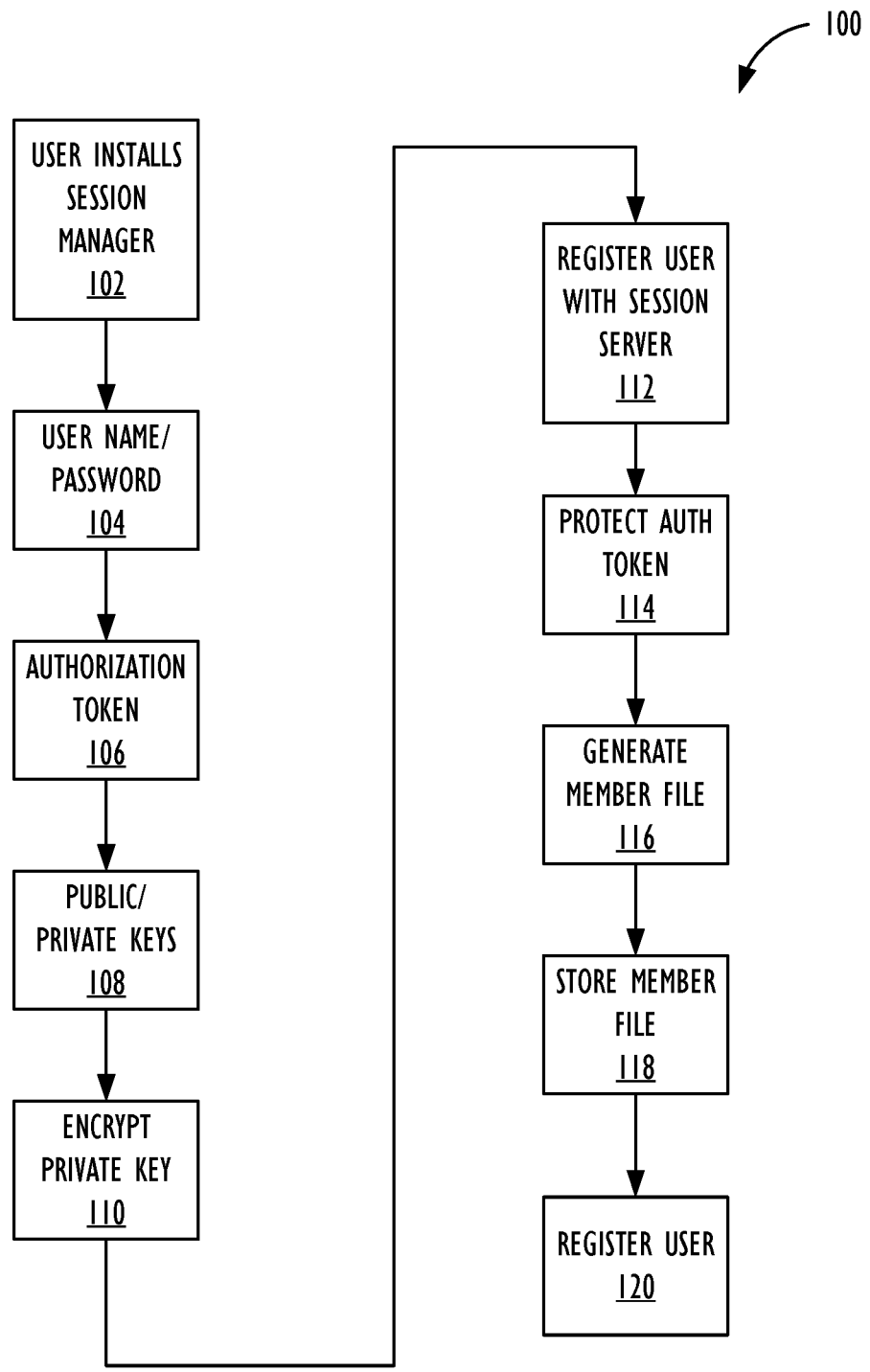
FIG. 1 is a flow diagram illustrating application installation and user registration sessions in accordance with at least one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In at least one embodiment, the invention can provide methods and processes for transparently managing, suspending, restoring, sharing, limiting and migrating user sessions on a device without having access to a user's login credentials. A user may share sessions and provide read-only access to authorized users. Other embodiments can include extending a life-time of an active session.

As used herein, the term "a computer system" can refer to a single computer or a plurality of computers working together to perform the function described as being performed on or by a computer system.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "sessions" can refer to data that can be shared between a user's browser and a particular web service running on a remote server, which in some embodiments, are passed through on every request. Sessions may be stored as a cookie on the browser, or any other local storage available, among other arrangements that will be readily understood by the skilled person.

As used herein, the term "credentials" can refer to data that can be specific to a certain user used to authenticate with a specific service on the web. These can include, but are not limited to, a username and a password.

As used herein, the term "session manager" can refer to a service running on a user's device that can allow the user to synchronize session data with a session server, and communicate with the user's browser to suspend and restore sessions.

As used herein, the term "virtual private network" (VPN) can refer to extending a private network across a public network, such as the Internet. It can enable a computer to send and receive data across shared or public networks as if it is directly connected to the private network, while benefiting from the functionality, security and management policies of the private network, among other private network features that will be readily understood by the skilled person. A VPN can be created by establishing a virtual point-to-point connection through the use, for example, of dedicated connections, virtual tunneling protocols or traffic encryption, among other arrangements that will be readily understood by the skilled person.

As used herein, the term "VPN client" can refer to a service running on a user's device that can allow the user to access the VPN.

As used herein, the term "master password (MP)" can refer to a user-supplied password that can be used to authenticate with, for example, the session manager, VPN client and VPN. It is combined with the username and a derivation mechanism to result in the Authentication Information.

As used herein, the term "authorization token" can refer to a derived version of the Master Password that can be used to validate the authenticity of a user, and to decrypt the user's data. The Authorization Token can be transmitted from the user's device to the session Server, and compared with the version of the authenticity token stored on the session Server for that particular user.

As used herein, the term "encryption keys" can refer to a cryptographic algorithm which can require two separate keys, one of which can be secret (or private) and one of which can be public (public/private key pairs). Although different, the two parts of this key pair are mathematically linked.

As used herein, the term "public key" can refer a key that can be used to encrypt plaintext or to verify a digital signature.

As used herein, the term "private key" can refer to a key that can be used to decrypt ciphertext or to create a digital signature.

As used herein, the term "session server" can refer to a centralized storage for syncing session Data across devices and users. In at least one embodiment, it can provide access to users' encrypted session Data.

As used herein, the term "session server Application Programming Interface (API)" can refer to a programmatic interface for the session manager and VPN client to authenticate users and sync encrypted session Data remotely. It also provides a way for the session manager and VPN client to retrieve users' public keys for sharing session data.

As used herein, the term "member file" can refer to data that can be associated to a specific user and stored on the session Server. This can include (but is not limited to) a username, authentication token, encrypted private key and public key.

As used herein, the term "authentication information" can refer to, in at least one embodiment, the combination of username and derived version of the Master Password, used to authenticate a user with the session Manager, VPN client and VPN.

As used herein, the term "session data" can refer to a collection of data related to the users' sessions. When located on the user's device and on the VPN, these can be in plain, unencrypted form. When synced to the session Server, they can be in an encrypted format.

As used herein, the term "encrypted user data" can refer to a user's session Data that can be encrypted with the Authorization Token As used herein, the term "encrypted private key" can refer to a user's Encrypted Private Key that can be used to decrypt sessions that are shared with the user. It can be stored in an encrypted state on the session Server, and can be decrypted on the user's device using the Authorization Token.

As used herein, the term "cookies" can refer to a small piece of data that can be sent from a website and stored in a user's web browser while the user is browsing that website. A cookie is also known as a Hypertext Transfer Protocol ("HTTP") cookie, web cookie, or browser cookie, In some embodiments, the browser sends the cookie back to the server to notify the website of the user's previous activity when the user loads the website.

As used herein, the term "browser storage" can refer to Web storage and/or DOM (Document Object Model) storage are web application software methods and protocols used for storing data in a web browser. Web storage supports persistent data storage, similar to cookies but with a greatly enhanced capacity and no information stored in the HTTP request header. There are two main web storage types: local storage and session storage, behaving similarly to persistent cookies and session cookies respectively.

As used herein, the term "session sharing" can refer to the fact that it is contemplated that users can share one or multiple sessions with other users by encrypting them with the receiving user's public key. Shared sessions can be synced through the session Server.

As used herein, the term "sharing restrictions" can refer to the fact that it is contemplated that users may apply restrictions to a session that a first user shares with a second user. These restrictions can be applied on a session-by-session basis, and limit the ability for the receiver to modify the state of the shared session.

As used herein, the term "shared session data" can refer to session Data that can be received from another user. It can be in of two states: locked or unlocked (see below).

As used herein, the term "locked shared session data" can refer to, in at least one embodiment, shared session data that cannot be viewed or modified by the receiver. In at least one embodiment, the receiver can use the VPN to use this data.

As used herein, the term "unlocked shared session data" can refer to, in at least one embodiment, shared session data that can be viewed or modified by a motivated receiver. In at least one embodiment, the receiver may either use the session Manager or the VPN to use this data.

As used herein, the term "input filters" can refer to filters that can be applied by the VPN to incoming requests to restrict certain types of HTTP(s) requests on shared sessions. For example, a shared session may be restricted so as not to allow the receiver to log out of the session. In this case, a POST to /logout can be filtered and not allowed.

As used herein, the term "output filters" can refer to filters that can be applied by the VPN and session Manager to HTTP(s) responses on shared sessions to restrict certain Hypertext Markup Language ("HTML") content from being displayed to the user. For example, an output filter could remove the "logout" button from the HTML content that is returned, or hide a link that would allow the receiver of a shared session to modify the session state.

As used herein, the term "with no restrictions" can refer to when a session is shared with No Restrictions, no input or Output Filters are applied to the incoming requests and outgoing responses.

As used herein, the term "Secure Sockets Layer (SSL)" can refer to a Secure Sockets Layer ("SSL") session can begin with an exchange of messages called the SSL Handshake. The handshake allows the server to authenticate itself to the client by using public-key techniques, and then allows the client and the server to cooperate in the creation of symmetric keys used for rapid encryption, decryption and tamper detection during the session that follows. Optionally, the handshake also allows the client to authenticate itself to the server.

As used herein, the term "document object model (DOM)" can refer to a cross-platform and language independent convention for representing and interacting with objects in HTML, Extensible Hypertext Markup Language ("XHTML") and Extensible Markup Language ("XML") documents. Objects in the DOM tree may be addressed and manipulated by using methods on the objects.

All encryption and decryption discussed herein can be accomplished by any known means, as will be readily understood by the skilled person.

A technique allows for transparently managing, suspending, restoring, sharing, limiting and migrating user sessions on a device without having access to user credentials. A user may automatically log in and out of each or all their online accounts instantaneously and, in doing so, the user may share sessions without sharing passwords across client devices as well as with other authenticated and authorized users. Sharing may be done in a secure manner with the initiating-user being able to restrict shared session rights, as well as being able to remove access to each of the shared sessions. Technical effects include a system that may save, restore, or keep-alive for an extended period a user log-in into a website without having access to a user's credentials.

Figure 11:
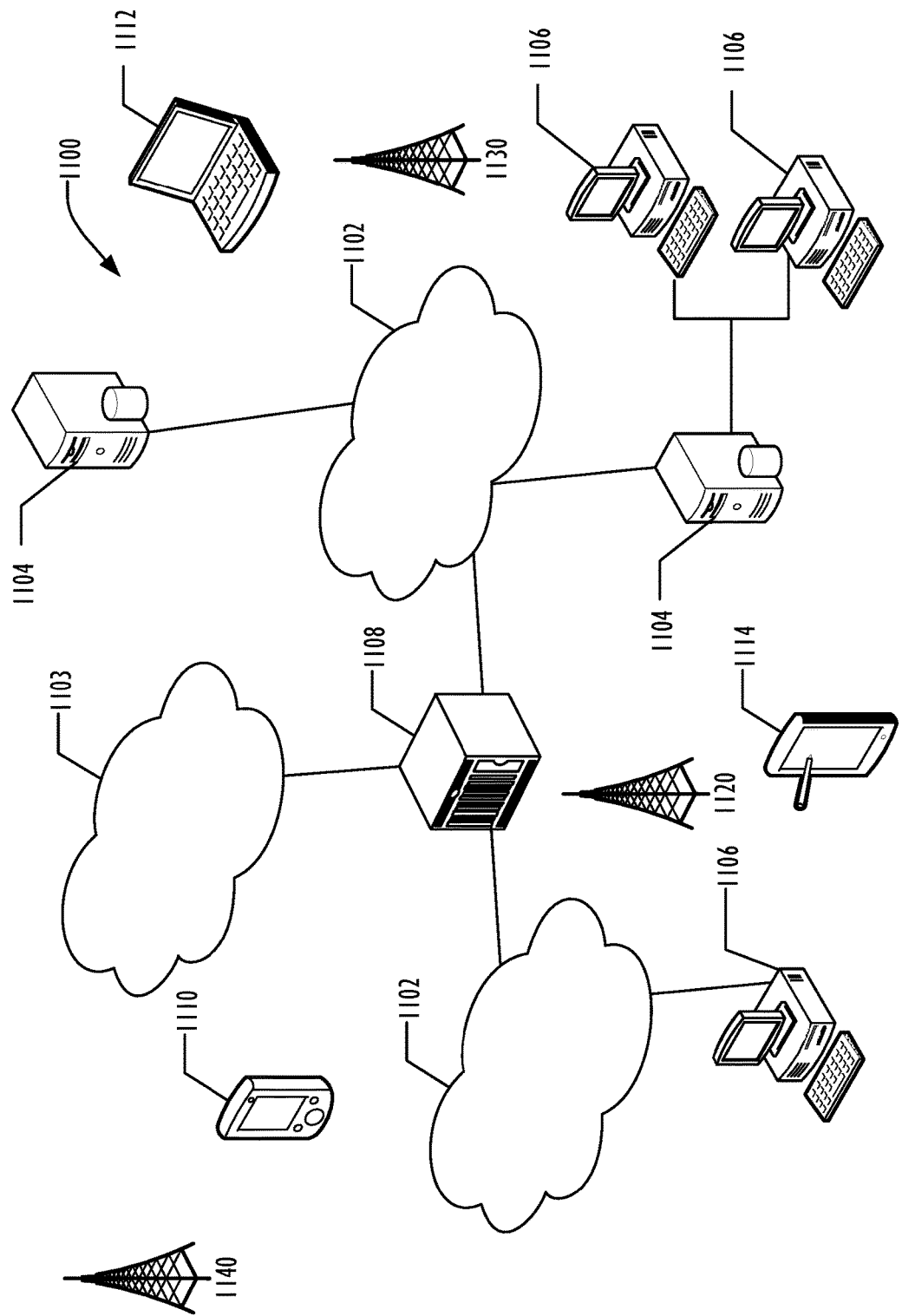
FIG. 11 is a diagram illustrating a network of programmable devices according to one embodiment.

Turning now to FIG. 1, one embodiment of the invention is illustrated in process 100 wherein an application may be stored on a user device such as, for example, mobile device 1114 of FIG. 11, and a user may be registered. In 102, according to one embodiment, the user may install a session manager on user client device 1114 (FIG. 11) as a standalone application or bundled with at least one other third party application (among other arrangements that will be readily contemplated by the skilled person). Alternatively, in other embodiments, a user may install a virtual private network ("VPN") client (or session manager VPN client) on client device 1114 (FIG. 11).

In 104, the user of client device 1114 (FIG. 11) may then be prompted to provide, for example, a username and a master password ("MP"), among other login information that will be readily understood by the skilled person.

In 106, an authorization token may then be generated based on this received login information from user.

In 108, in one embodiment, public and private encryption keys may be generated.

In 110, the generated private key can be encrypted.

In 112, the user of client device 1114 (FIG. 11) may be registered with the session server, by sending via a network such as, for example, network 1102 (FIG. 11) the authorization token and public key to a remote session server (e.g., server 1104 (FIG. 11)) through session server's Application Programming Interface (API). Upon receipt of the login information by the session server, the user can be registered.

In 114, in one embodiment, the session server may algorithmically protect the authorization token using a password-based key derivation function, such as, for example, scrypt. Further, in one embodiment, the session server may delete any copies of the unprotected authorization token received from client device 1114 (FIG. 11).

In 116, a member file may be generated consisting of user information such as, but not limited to, a username, the algorithmically protected authorization token, the public key, and the encrypted private key among other user information as will be readily understood by the skilled person.

In 118, the member file can then be stored, in a secure or insecure fashion, on the session server, among other analogous locations that will be readily understood by the skilled person. In 120, the user associated with client device 1114 (FIG. 11) may now registered in response to the creation of member file. While FIG. 1 is described with reference to device 1114 of FIG. 11, any other devices are also contemplated for use with process 100 including devices 1106, 1110 or 1112 (shown in FIG. 11).

Figure 2A:
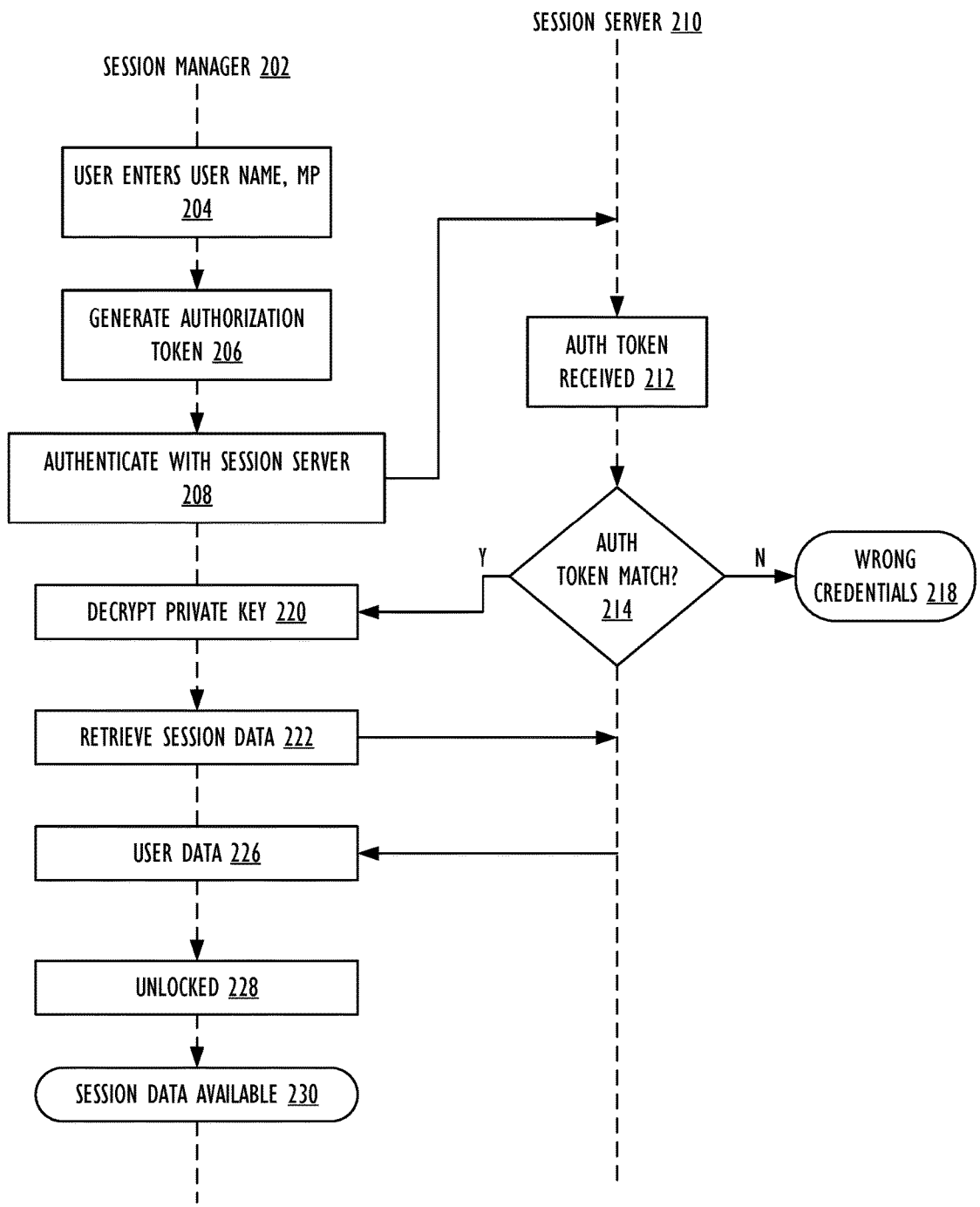
FIG. 2A is a flow diagram illustrating an authentication session without a virtual private network in accordance with at least one embodiment.

Turning now to FIG. 2A, one embodiment of the invention is illustrated wherein authentication of a user occurs without a VPN. In 204, a user may submit, via session manager 202 installed on client device 1114 (FIG. 11), authentication information of user such as, but not limited to, a username and a master password (MP), among other types of authentication information that will be readily understood by the skilled person. In 206, this inputted authentication information, along with any other suitable pieces of information that will be readily apparent to the skilled person, can be used to generate an authorization token. In 208, authorization token may be used for authenticating a session with a session server 210. In one embodiment, the username along with the authorization token may be used to authenticate the user on session server 210 through a session server API.

In 212, session server 210 receives the authorization token from session manager 202 for comparison. In 214, session server 210 determines if the received authorization token from session manager 202 matches the algorithmically protected authorization token that is stored in the member file (discussed in step 118 of FIG. 1). If the received authorization token matches the algorithmically protected authorization token in session server 210 (i.e., step 214="Y"), then, in 220, the user is authenticated and an encrypted private key may be received for decryption, discussed below. Alternatively, if the received authorization token does not match the algorithmically protected authorization token stored in the member file (i.e., step 214="N"), then, in 218, a message can be returned to the user via session manager 202 or other user interface on client device 1114 (FIG. 11) indicating that the user is not authorized and/or credentials are wrong. In a similar manner, any received information in the authentication session can be compared to information stored in the member file for this authentication determination step.

In 220, if the user is authenticated, user information such as, but not limited to, the public key, and the encrypted private key may be retrieved from the corresponding member file. The encrypted private key on client device 1114 (FIG. 11) and the encrypted private key on client device 1114 (FIG. 11) may be decrypted.

Figure 5:
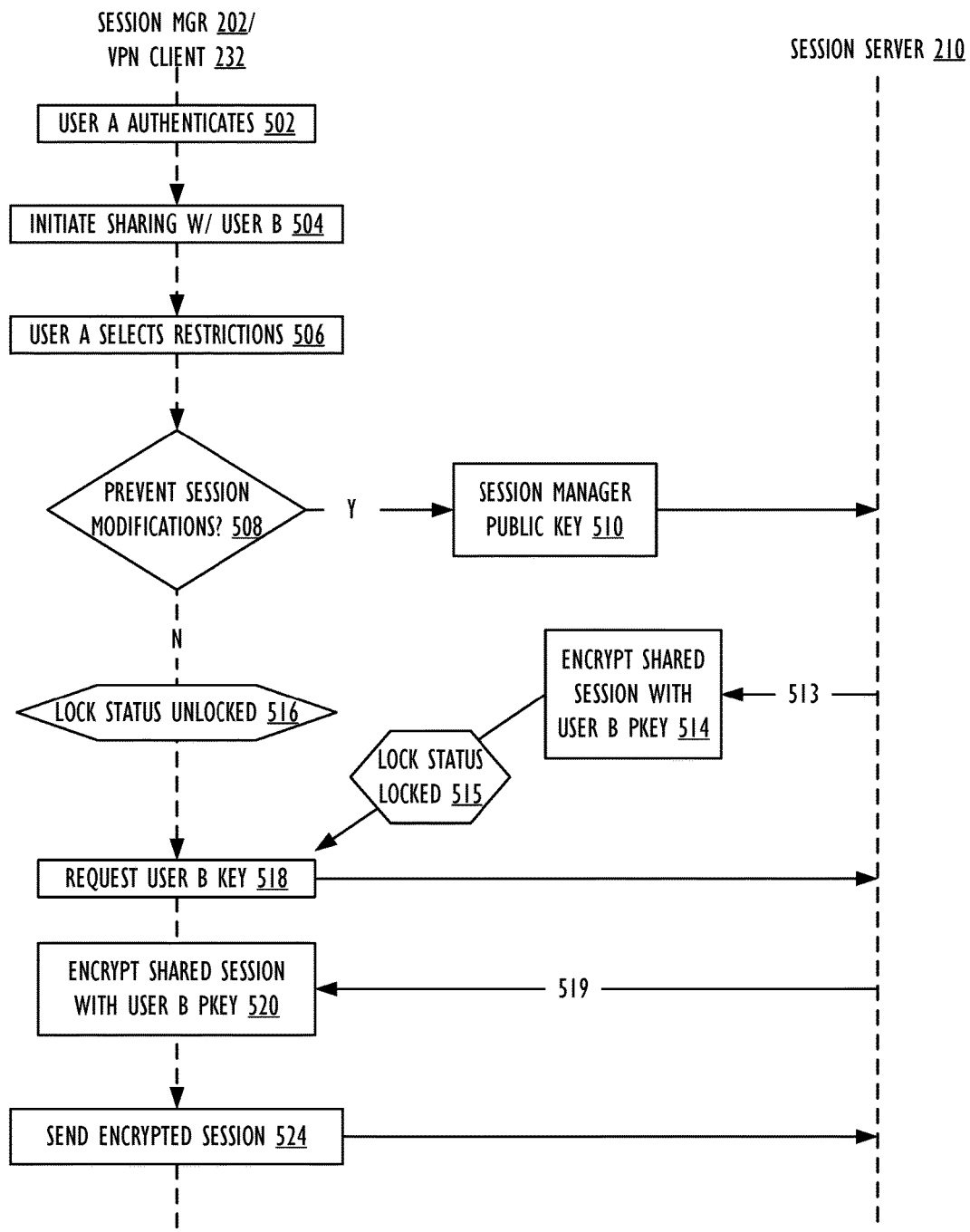
FIG. 5 is a flow diagram illustrating the initiation of a sharing session in accordance with at least one embodiment.

In 222, session data may be retrieved from session server 210. In an example, a request for session data from session server 210 may be made by making a request by session manager 202 that is associated with a user name to session server 210 through the session server API. In response to this request, session server 210 can return, for example, encrypted user data and any encrypted unlocked shared sessions, as will be discussed later in relation to FIG. 5 depicted below.

In 226, encrypted user data may be received and decrypted with the authorization token. In a similar manner, in 228, the encrypted shared sessions can be decrypted with the user's private key. In 230, the user's own session data and session data shared with the user may be available for use by session manager 202.

Figure 2B:
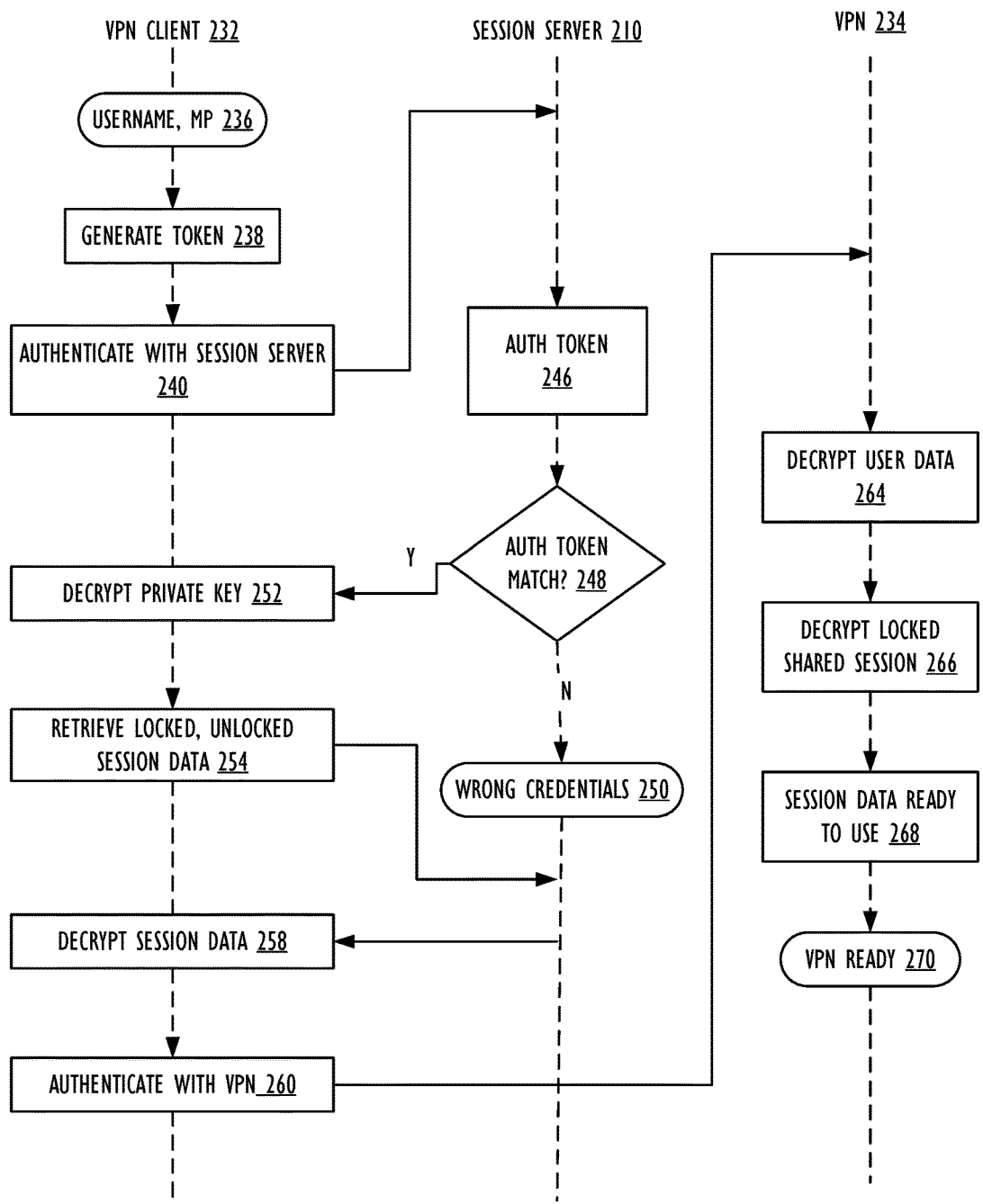
FIG. 2B is a flow diagram illustrating an authentication session through a virtual private network in accordance with at least one embodiment.

Turning now to FIG. 2B, one embodiment of the invention is illustrated wherein authentication occurs through a VPN. In 236, a user may submit authentication information through a VPN client 232 such as, but not limited to, a username and a master password (MP), among other types of authentication information that will be readily understood by the skilled person. In 238, this inputted authentication information, along with any other suitable pieces of information, such as but not limited to personal information, that will be readily apparent to the skilled person, can be used to generate an authorization token. In 240, authorization token generated may be used for authenticating a session with a session server 210. In an embodiment, the username and the authorization token may be used to authenticate the user on session server 210 through a session server API.

In 246, the authorization token may be received and stored in session server 210. In 248, session server 210 may determine, in an embodiment, if the received authorization token matches the algorithmically protected authorization token that is stored in member file (shown and described in step 118 of FIG. 1). If the tokens match (i.e., step 248="Y"), then, in 252, the private key on client device may be decrypted from retrieved information from session server 210. In embodiments, information such as, but not limited to, the public key, and the encrypted private key from session server 210, can be securely retrieved from the corresponding member file. Also, the retrieved encrypted private key may be decrypted with the authorization token.

But, if the received authorization token does not match the algorithmically protected authorization token stored in the member file (i.e., step 248="N"), then, in 250, a message may be returned to the user indicating that the user is not authorized as the user credentials are wrong. In an embodiment, any received information in the authentication session can be compared to information stored in the member file for this authentication determination step 248.

Next, in 254, both unlocked and locked shared sessions may be retrieved from session server 210 via VPN client 232, as discussed in further detail at FIG. 5 below. In an embodiment, retrieval occurs upon submitting a shared session data request to session server 210 through a session server API. The requested data can be retrieved and sent to VPN client 232, which may include, in some non-limiting examples, encrypted locked shared session data and encrypted unlocked shared session data. In 258, this encrypted shared session data may be decrypted with the decrypted private key to result in decrypted locked session data and decrypted unlocked session data. It is to be understood that the decrypted locked session data may still be encrypted with the session manager 202's (FIG. 2A) public key, as will be discussed in further detail at FIG. 5.

In 260, VPN client 232 authentication may occur with VPN 234, which may include, sending authorization information to a VPN API such as, but not limited to, information related to the authorization token, username and decrypted unlocked session data, among other authorization data that will be readily appreciated by the skilled person. In 264, user data may be decrypted using the authorization token. Further, in 266, the decrypted locked shared session data may be decrypted using the session manager public key. In 268, session data may be now available to use by VPN 234 and VPN 234 is now ready to accept requests.

Figure 3A:
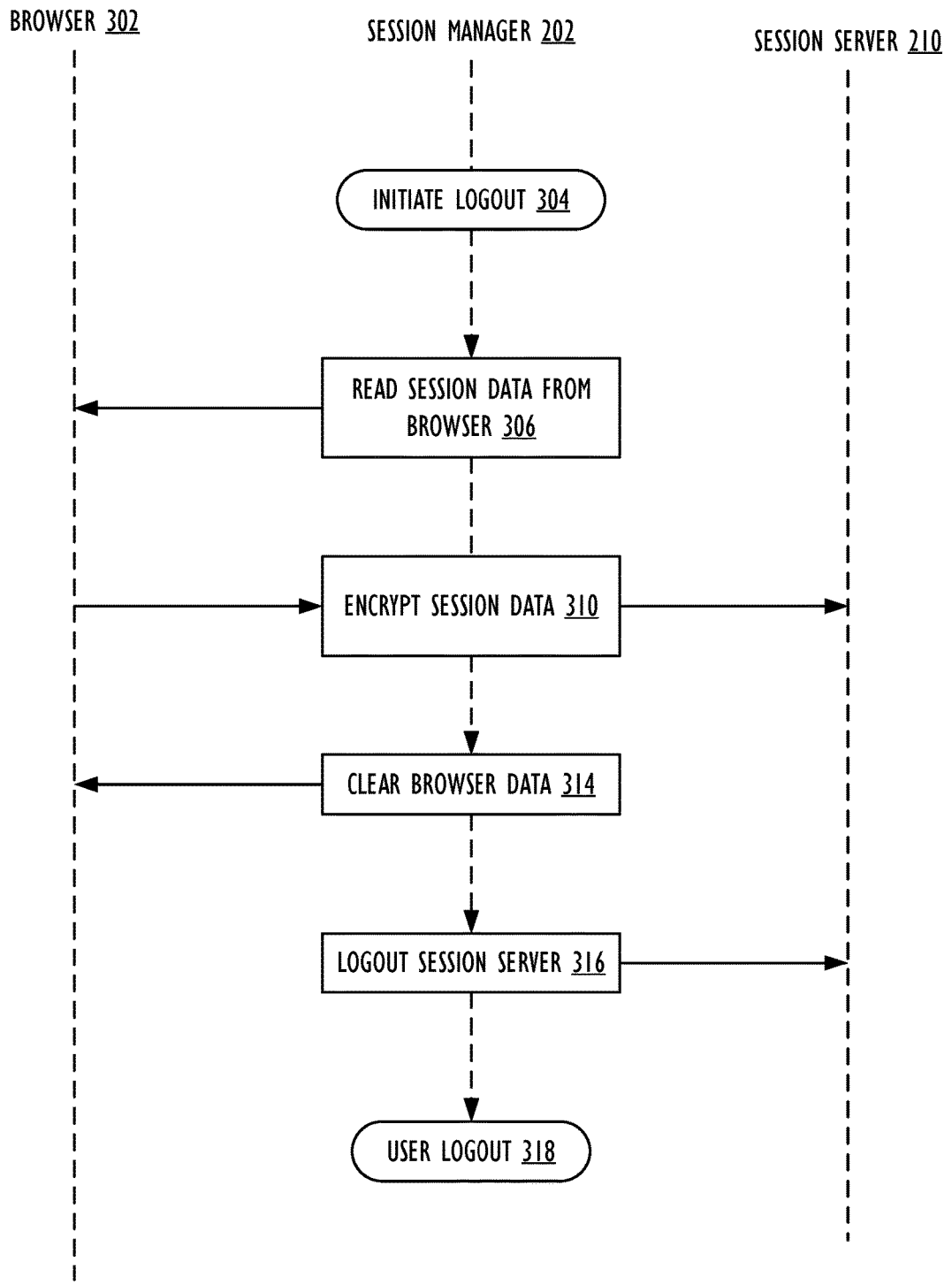
FIG. 3A is a flow diagram illustrating a logout session without a virtual private network in accordance with at least one embodiment.

Turning now to FIG. 3A, an embodiment of the invention is illustrated wherein logout of a session may be executed without a VPN. If the user is not using a VPN, session manager 202 may initiate logout 304. In an embodiment, session manager 202 may request that the session data 306 is read from a user browser 302 and this retrieved session data can be encrypted to form encrypted session data 310. In an embodiment, this session data 306 may be encrypted with the authorization token to create encrypted user data 310 (or encrypted session data 310). In one embodiment, this encrypted user data 310 may be communicated to session server 210 for storage. Storage may be configured to be any suitable data storage arrangement that will be readily understood by the skilled person, including remote storage, local storage, secure storage, insecure storage and volatile storage, among other arrangements that will be readily appreciated.

Next, browser 302's session data may be cleared 314 which, in one embodiment, may involve deleting cookies from browser 302's storage. Logout from session server 316 may then commence by sending a logout command to session server 210. The user may now be successfully logged out of a session on browser 302 in block 318.

Figure 3B:
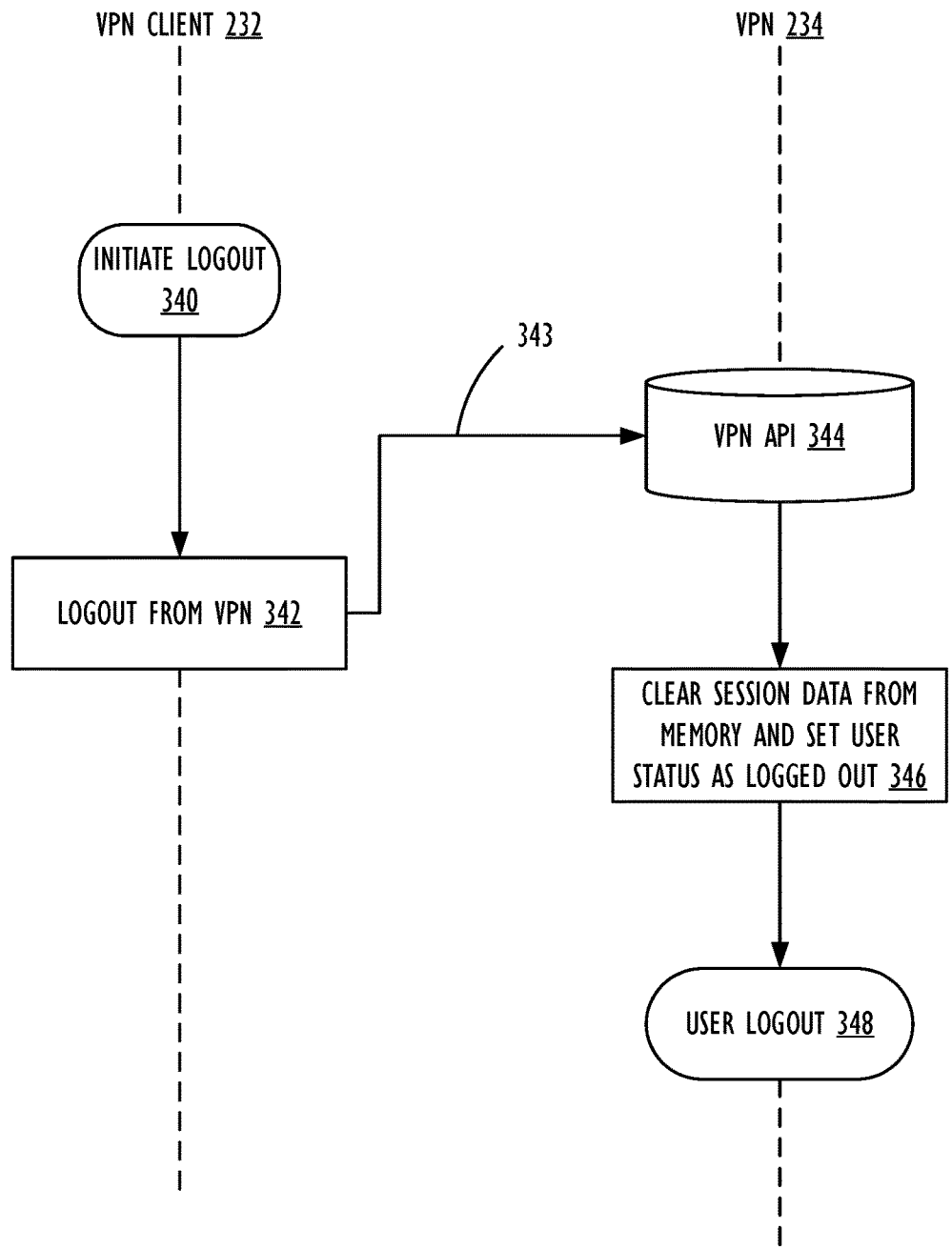
FIG. 3B is a flow diagram illustrating a logout session through a virtual private network in accordance with at least one embodiment.

Turning now to FIG. 3B, one embodiment of the invention is illustrated wherein logout of a session may be executed with a VPN. If a user of a VPN client 232 is using a VPN 234, user may initiate logout 340 from VPN 234. Logout from VPN 342 may be made by initiating a logout request 343 from VPN client 232 to a VPN API 344. From here, all session data may be cleared from memory 346, which may be, in embodiments, either volatile memory or permanent memory, secure or not secure, among other arrangements that will be readily recognized. The user's status may be set as logged out. Once user's status is changes and session data is cleared, user logout 348 is successful.

Figure 4A:
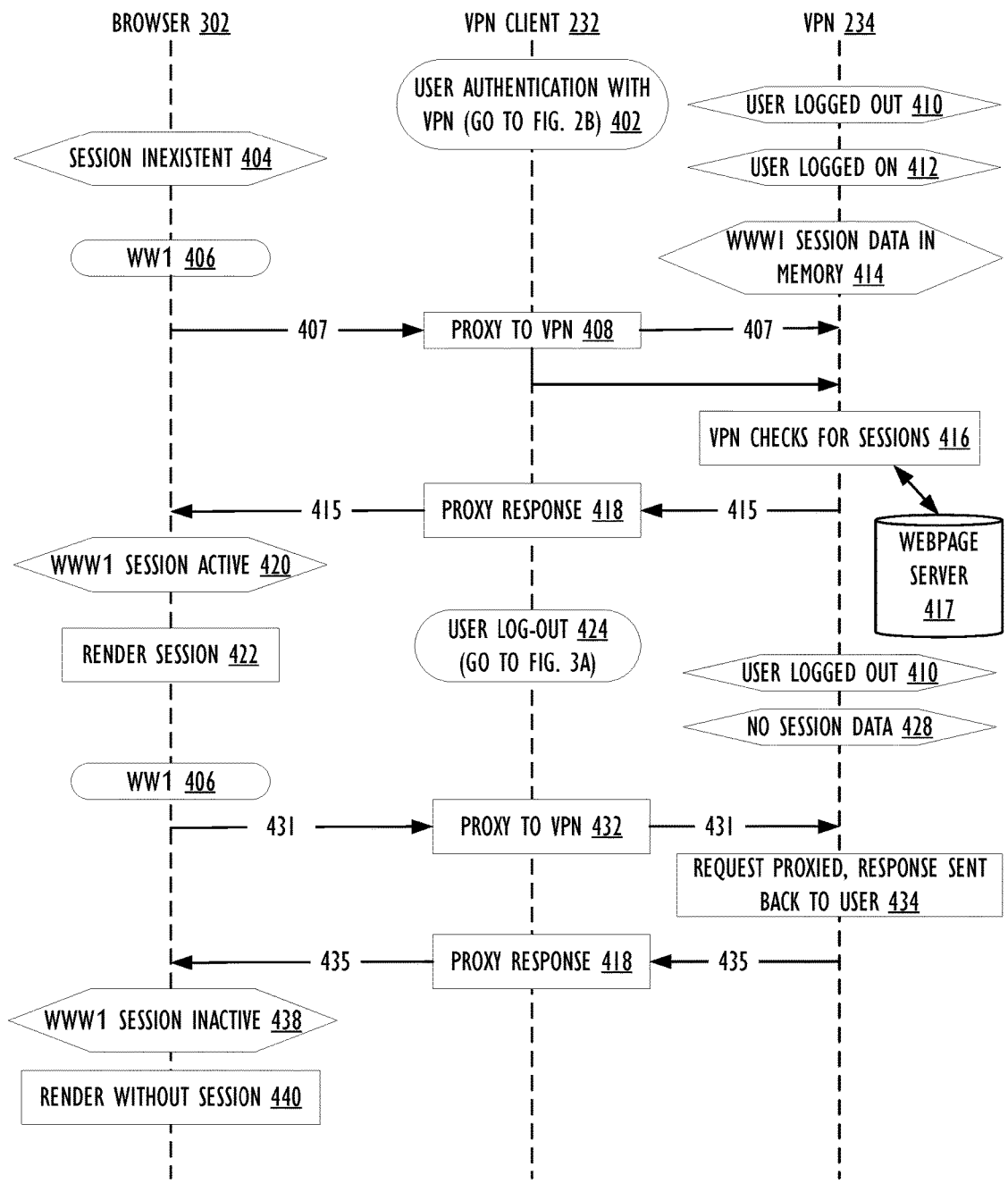
FIG. 4A is a flow diagram of a login/logout session with an active virtual private network in accordance with at least one embodiment.

Turning now to FIG. 4A, one embodiment of the invention is illustrated wherein a login/logout session is executed through an active VPN 234. Prior to a session through a user browser 302, the user is logged out 410 and may authenticate through VPN 402 as discussed above in relation to FIG. 2B. A user logs on 412 using VPN client 232. A session may be inexistent 404 on browser 302. Also, a previous session may exist 414 in memory in VPN 234. The session may be initiated (when the user visits a webpage 406 using browser 302). A request 407 may be sent to VPN 234 as proxy to VPN 408 and VPN client 232 may check for sessions 416 on webpage server 417 to determine if a previous session exists (as discussed in further detail at FIG. 6) that are associated with the same domain name. If an appropriate session exists, then a response 415 may be sent back as proxy response 418 to browser 302 as proxy to VPN 408 response through VPN 234.

In one embodiment, request 407 may be sent by proxy to VPN in block 408 through VPN 234, and VPN 234 may check to see if previous sessions exist 414 that are associated with the same webpage. If an appropriate session exists, then this session may be added to request 407 effectively enabling the session on request 407. In an embodiment, request 407 may then be proxied normally to webpage server 417 by VPN client 232, and a response 415 received and directly sent back to the user through a VPN proxy response 418, as will be discussed further in FIG. 6 below.

A session associated with the particular webpage is now active 420, and the webpage may be rendered through an appropriate session 422. If the user logs out 424 from VPN 234 (as shown in FIG. 3A), session data from may be cleared from memory 428, and if, in some embodiments, the user subsequently visits the webpage 406, a VPN proxy request 431 may be sent. Request 431 may be proxied normally as proxy to VPN 432 to webpage server 417 via in VPN client 232. A response 435 may be retrieved from webpage server 417 and sent directly back to browser 302 in block 434 by the VPN client 232 through a VPN proxy response 418. The particular webpage can be rendered in browser 302 without an associated webpage session being active 440.

Figure 4B:
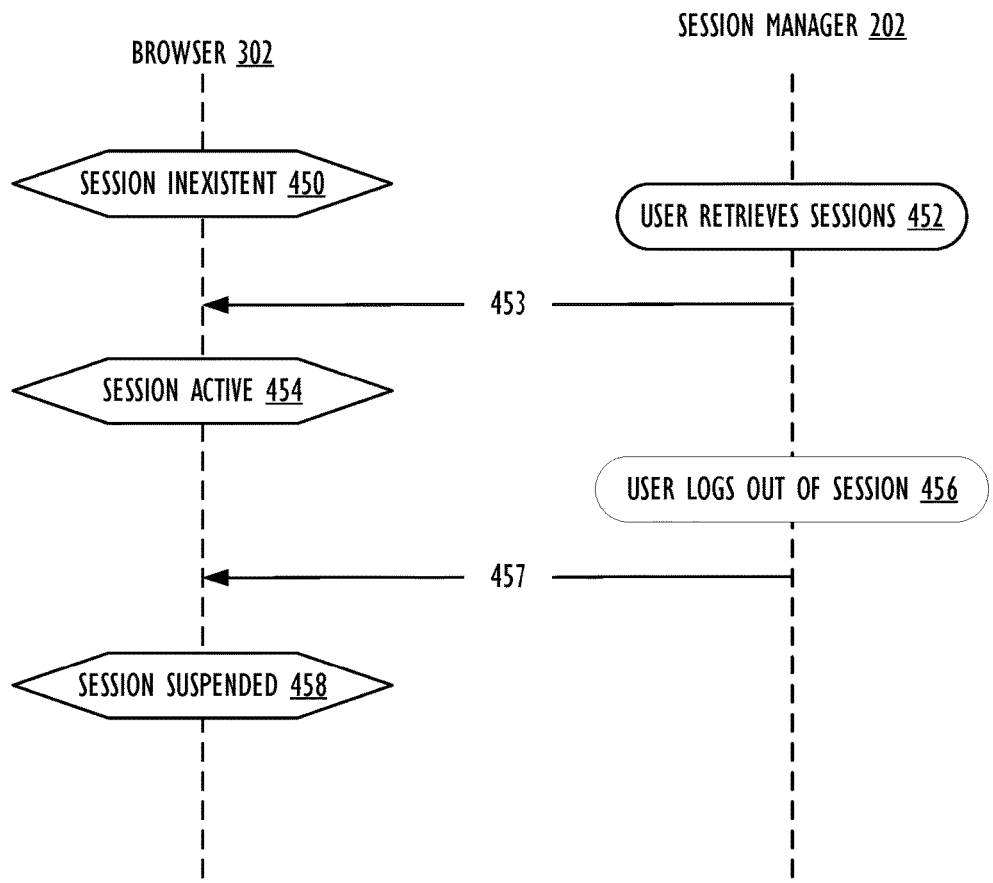
FIG. 4B is a flow diagram illustrating a login/logout session without an active virtual private network in accordance with at least one embodiment.

Turning now to FIG. 4B, one embodiment of the invention is illustrated wherein a login/logout session may be executed without an active VPN. In an embodiment, the process starts with no session existing 450 in browser 302 and the user logs into session manager 202 and can retrieve all previous sessions 452 and inject them 453 into user's browser 302, as detailed previously in FIG. 2A. The session can then be activated 454 in browser 302.

Next, in one embodiment, the user may log out session manager 202 in block 456 and suspend all on-going sessions, as shown and described in FIG. 3A. These sessions can then be suspended 458 on browser 302 through a response 457.

Turning now to FIG. 5, one embodiment of the invention is illustrated for sharing sessions between users such as, for example, a session creator (e.g., user A) and receiver user (e.g., user B) wherein a sharing session may be initiated. In one embodiment, user A may authenticate 502 either directly through a session manager 202 or through a VPN client 232 (as depicted in FIG. 2A or 2B). User A may then initiate sharing the current session 504 with user B. User A may also, in an embodiment, select restrictions or accesses 506 to be applied to the shared session that may be in progress. By way of one non-limiting example, user A may restrict user B from accessing any cookies injected into a particular session or, alternatively, user A may restrict user B from modifying the code associated with the shared session, among other arrangements that will be readily contemplated by the skilled person.

In one embodiment of the invention, user A may specify whether user B is to be prevented from being able to read or make modifications to the shared sessions, or to the sharing restrictions 508. If user A decides to restrict the shared session and prevent session modification (i.e., step 508="Y"), then, the shared session is described as "locked". In embodiments, session manager 202 or VPN client 232 of user A may request session manager's public key 510 from session server API on session server 210. In embodiments, session manager 202 or VPN client 232 may retrieve the session manager 202's public key 510 as response 513 and may use it to encrypt shared session 514. Encrypting the shared session creates a locked session 515. However, if user A decides not to restrict the shared session (i.e., step 508="N"), it is described as "unlocked" 516, and it is assumed that a capable receiver can view/modify the session and/or associated restrictions.

Next, session manager 202 or VPN client 232 may request user B's public key 518. In an embodiment, user B's public key 518 may be stored in a mutually accessible location such as, but not limited to, session server 210. User B's public key may then be retrieved 519 from session server 210. User B's public key may be used to encrypt shared session 520 between user A and user B. In one embodiment, user B's public key may be stored for later use in any suitable location, including but not limited to, remotely, locally, securely or not securely, among any other arrangements that will be readily contemplated by the skilled person.

An encrypted session between users A and B may be sent 524 to session server 210 and stored on session server 210. The encrypted session may be associated with either or both of the users A and B that are involved in the shared session.

Figure 6:
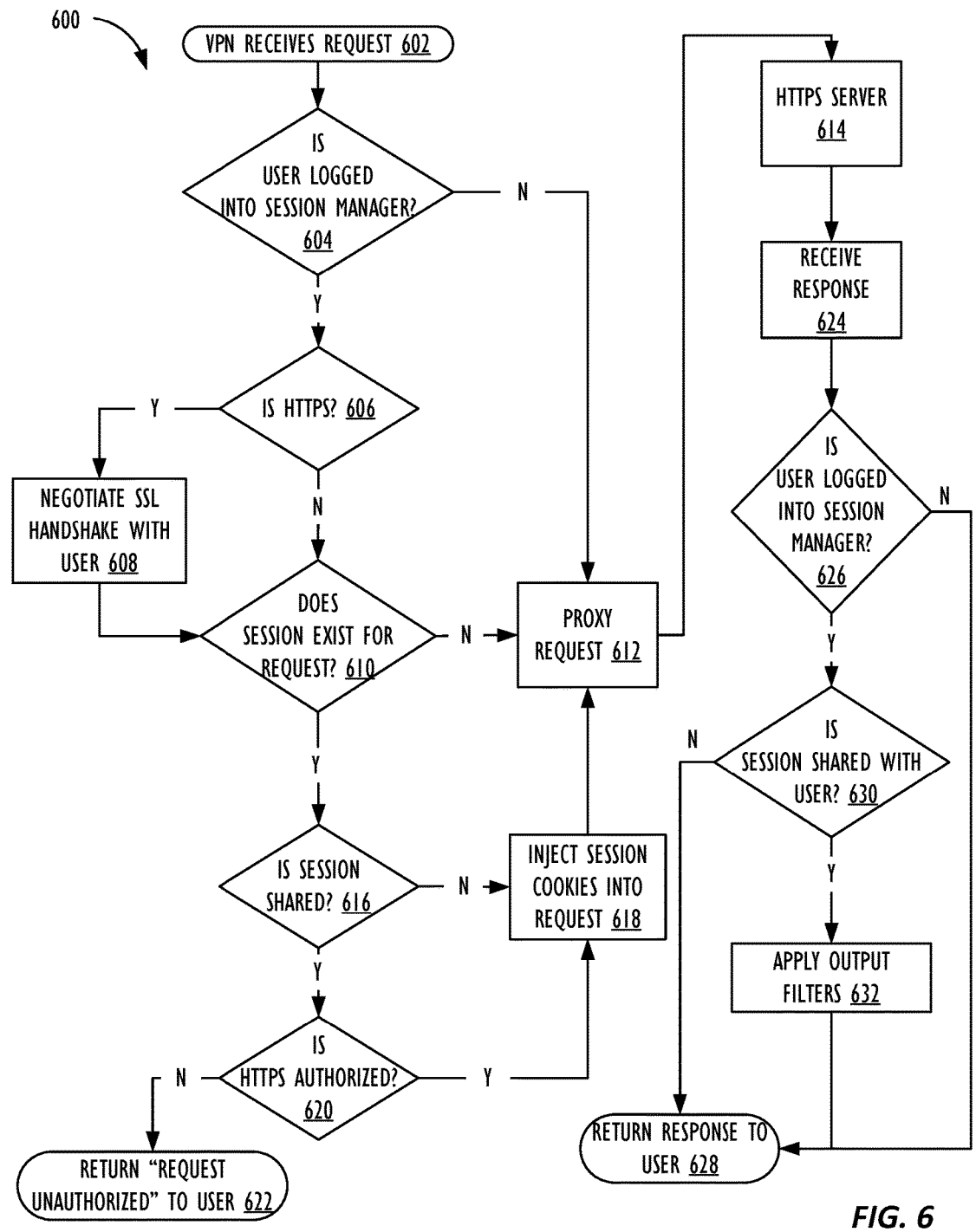
FIG. 6 is a flow diagram illustrating virtual private network functionality in accordance with at least one embodiment.

FIG. 6 illustrates a process 600 depicting a technique for VPN functionality according to one embodiment. In an embodiment, a VPN, e.g., VPN 234, may receive, in 602, a request for a session from a second user (i.e., session receiver). In 604, a determination may be made whether second user is logged into session manager, e.g., session manager 202. If the second user is logged into session manager (step 604="Y"), then, in 606, a determination may be made if the connection is made through a secure protocol. If the connection is made through a secure protocol (step 606="Y"), then, in 608, a SSL handshake may be negotiated with the second user. In 610, a determination may be made whether a previous session exists for the user session request from step 602.

However, if the connection is not through a secure protocol (i.e., step 606="N"), then, process 600 proceeds to step 610 where a determination may be made whether a previous session exists for the request. If a previous session does not exist for the particular session request (i.e., step 610="N"), then, in 612, a proxy request may be generated. Similarly, in step 604, if second user is not logged into session manager, a proxy request may be generated, in 612.

If a previous session exists that corresponds to a particular request (i.e., step 610="Y"), then in 616, a determination is made whether the previous session was shared. If the session was not shared (i.e., step 616="N"), then, in 618, session cookies that may previously exist may be injected into a generated proxy request. However, if the previous session was shared (i.e., step 616="Y"), then, in 620, a determination is made whether an HTTP or HTTPS request is authorized by the parameters of the shared session. If HTTP or HTTPS request is authorized (i.e., step 620="Y"), then, in 618, session cookies may be injected into the proxy request. However, if the HTTP or HTTPS request is not authorized by the shared session permissions (i.e., step 620="N"), then, in 622, a message "request unauthorized" may be returned to second user indicating that second user is not authorized to participate in a shared session with a first user (i.e., a session creator). In embodiments, a plural number of input filters may be associated with a particular shared session and, in one embodiment, may be set by a first user who is actively sharing the session.

Continuing from step 612, once a proxy request is generated, in 614, the proxy request may be sent to the web server (e.g., HTTP or HTTPS server) and, in 624, a response may be retrieved from that HTTP or HTTPS server to the session manager. In 626, a determination may be made if the second user is logged into the session manager. If the second user is logged into the session manager (i.e., step 626="Y"), then, in 630, it may be determined if the session is shared with the second user. If the session is not shared with the second user (i.e., step 630="N"), then, in step 628, the response may be returned to the second user instructing the second user that the session is not shared with the second user. Similarly, if the second user is not logged into the session manager (i.e., step 626="N"), then, in 628, the response may be sent to the second user.

On the other hand, if the second user is shared with the session (i.e., step 630="Y"), then, in 632, the parameters and output filters associated with the particular shared session may be applied to the response. In 628, the response may be retrieved from the server and a modified or filtered response may be sent to the second user. It may be contemplated that, in one embodiment, direct modifications can be made to the HTML associated with the response such as, but not limited to, the second user may be prohibited from executing certain actions on the page such as logging out, or session cookies may be removed from the response so as not to be available to the shared second user. In one embodiment, it may be contemplated that the output filters are set by the first user sharing the session. While FIG. 6 is discussed in relation to a second user, it should be appreciated that any additional umber of shared users are also contemplated in the discussion of FIG. 6.

Figure 7A:
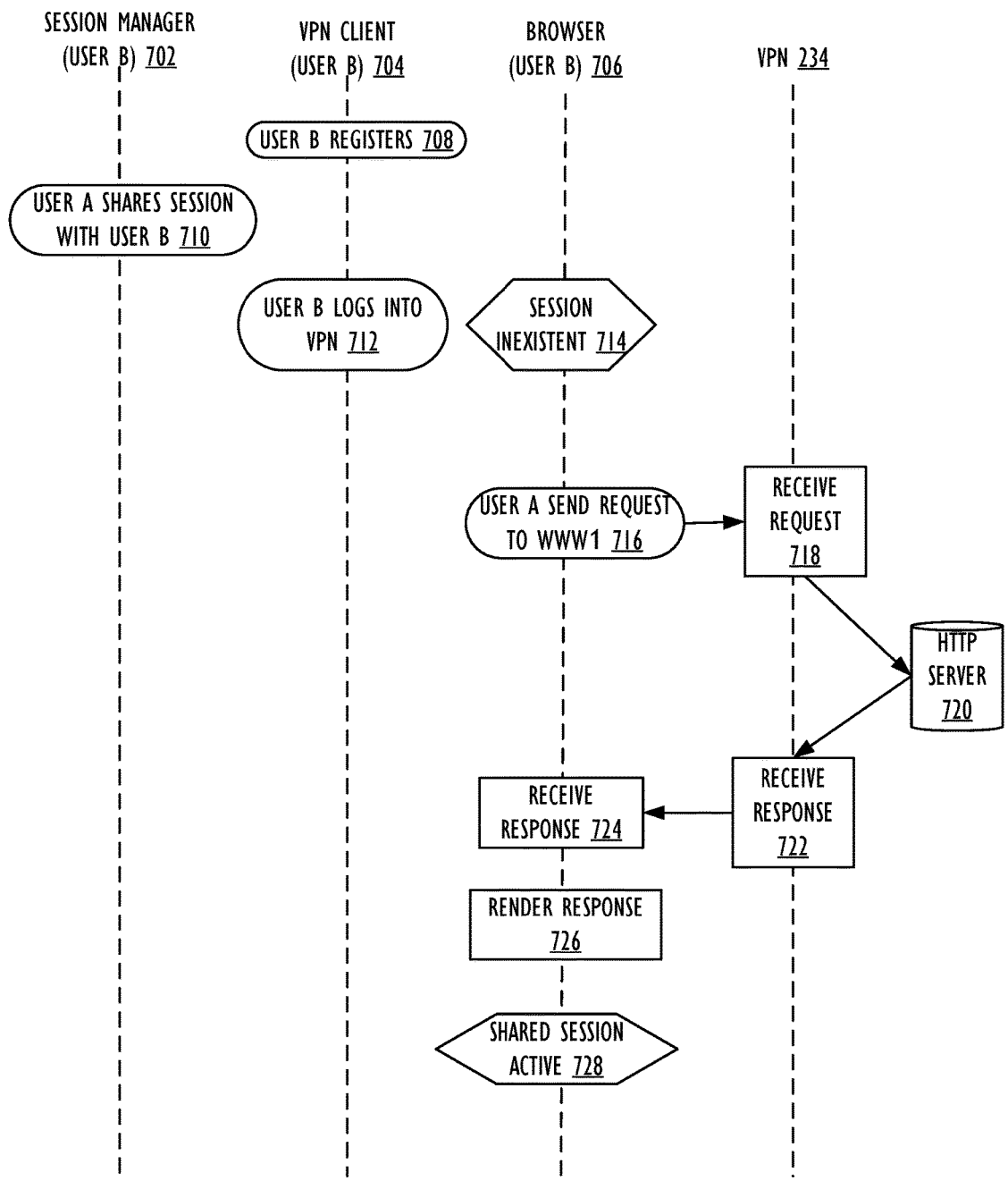
FIG. 7A is a flow diagram illustrating receiving a sharing session with an active virtual private network in accordance with at least one embodiment.

Turning now to FIG. 7A, one embodiment of the invention is illustrated wherein a shared session may be received through an active VPN 234. In an embodiment, a first user A may share a session relating to a particular webpage or domain name 710 with a shared second user B (as previously depicted in FIG. 5). Also, user B may have previously registered 708 and created a public key and private key for sharing (as previously depicted in FIG. 1). In order to receive a shared session, user B may log into VPN 234 using VPN client 704 in block 712 and retrieve and decrypt the shared session associated with a particular website (as previously depicted in FIG. 2B).

If the shared session did not previously exist (i.e., session inexistent 714) on browser 706, user B may send a request 716 through user B's browser 706 to the webpage or domain name associated with the shared session. This request may be sent by proxy through VPN 234 and any necessary input filters may be applied to request 716 (as discussed previously in FIG. 6) by VPN 234. The proxy request may be sent to the webpage or domain name server 720 and a response is retrieved 722 based on the request and sent by proxy through VPN 234 to browser 706 in block 724. In an embodiment, VPN 234 may apply any output filters accordingly to the request sent to browser 706 (as discussed previously in FIG. 6). The VPN 234 may render a response 726 based on the appropriate output filters and the shared session may be activated in browser 706 with the appropriate restrictions and filters applied. The session may then be activated 728 in browser 706.

Figure 7B:
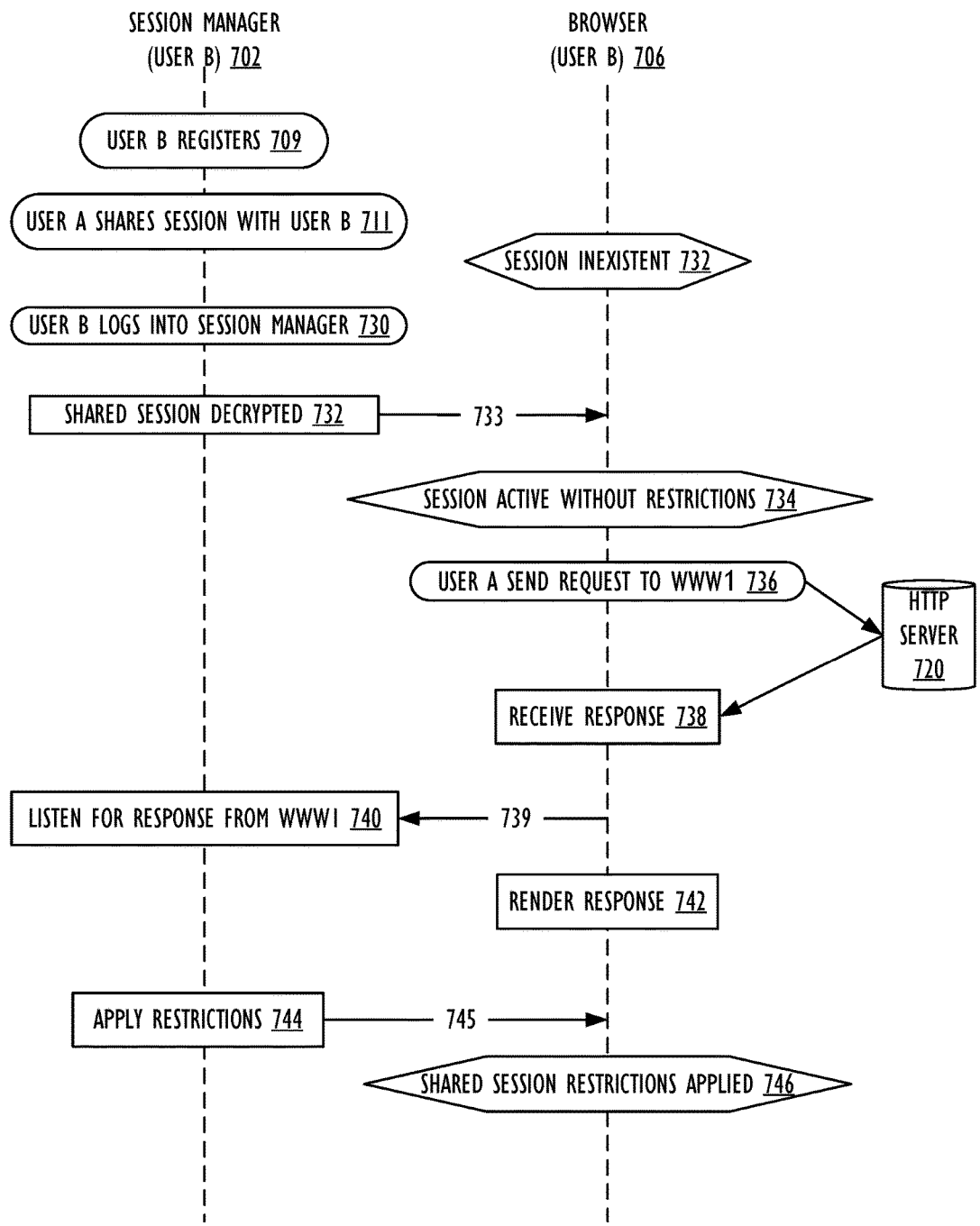
FIG. 7B is a flow diagram illustrating receiving a sharing session without an active virtual private network in accordance with at least one embodiment.

Turning now to FIG. 7B, one embodiment of the invention is illustrated wherein a shared session may be received without an active VPN. In an embodiment, a first user A may share a session relating to a particular webpage or domain name 711 with a shared or second user B (as previously depicted in FIG. 5). Also, user B may have previously registered 709 and created a public key and private key for sharing (as previously depicted in FIG. 1). In order to receive a shared session, user B may log into session manager 730 and retrieve and decrypt the shared session 732 associated with a particular website (as previously depicted in FIG. 2A). In an embodiment, if the shared session did not previously exist (session inexistent 732) on browser 706, user B may inject 733 the decrypted shared session 732 into browser 706, which may be activated with no restrictions 734 in browser 706.

In an embodiment, using browser 706, user B may send a request 736 for a webpage associated with a HTTP server 720. An associated response may be retrieved from the server and received 738 by browser 706. When response is received 738, session manager 702 may be notified via a notification 739 by browser 706. Session manager 702 may simultaneously listen for responses 740 from browser 706. Browser 706 may render a response 742 from web server 720, and session manager 702 may apply any required restrictions 744 to response 742. In an embodiment, session manager 702 may apply restrictions by modifying the Document Object Model ("DOM") elements 745 in the rendered webpage, however other arrangements are also contemplated that will be readily apparent to the skilled person. The webpage may be rendered in browser 706 with the shared session applied to the rendered webpage in block 746.

Figure 8:
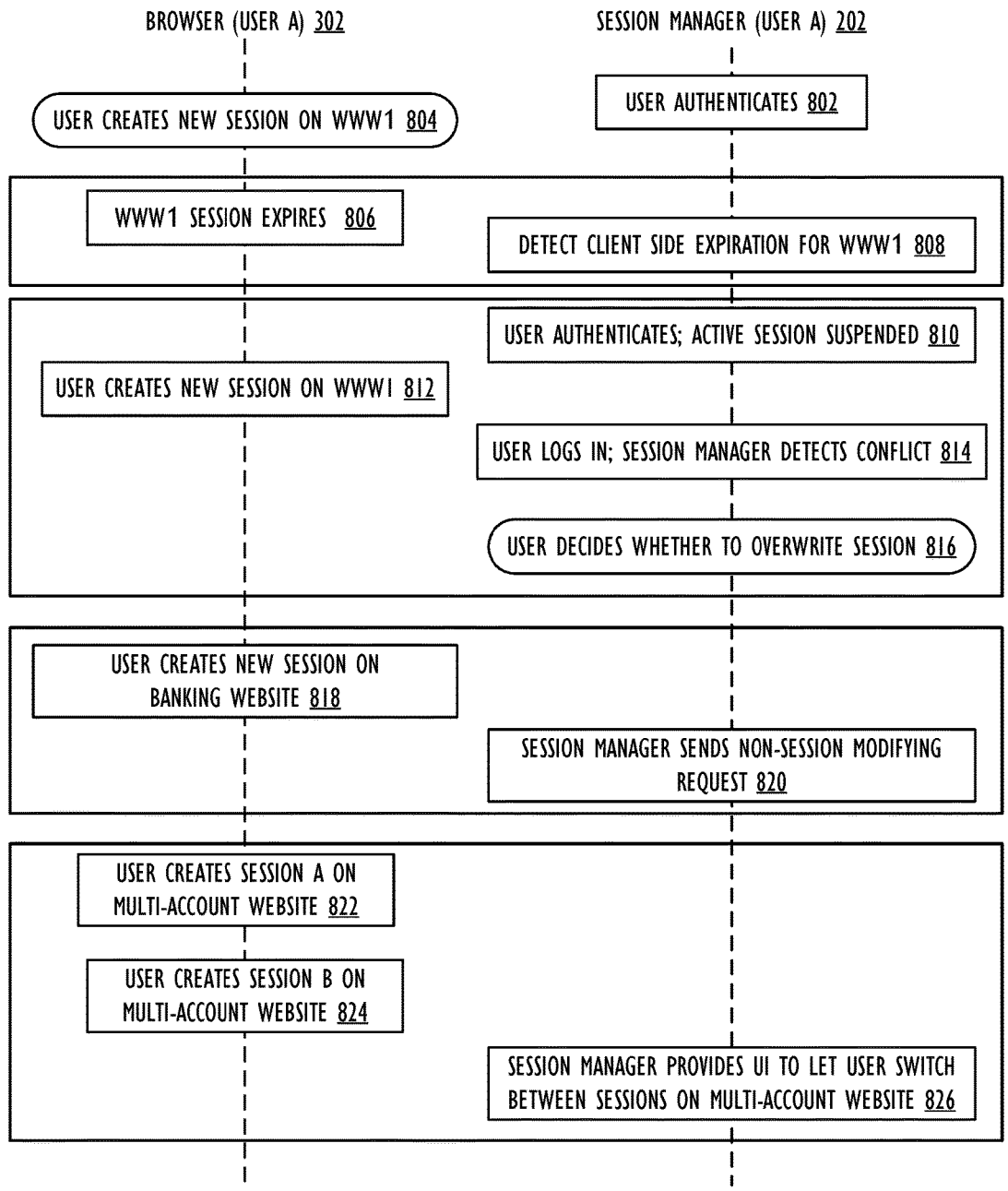
FIG. 8 is a flow diagram illustrating the functioning of an active session management with a master-user in accordance with at least one embodiment.

FIG. 8 illustrates active session management according to one embodiment. In an embodiment, a first user, e.g., user A may authenticate 802 with a session manager 202 (as previously depicted in FIG. 2). The user may then subsequently create a new session on a webpage associated with a particular domain name 804 on browser 302. If the session expires on browser 302, session manager 202 can detect this expiration 808 and increase the lifetime of the session. In an embodiment, increasing the lifetime may be modified such that, for example, all subsequent sessions that are associated with a particular domain name on browser 302 may have an extended lifetime, or alternatively the lifetime of a session may be increased on a case by case basis, among other arrangements that will be readily contemplated by the skilled person.

If the user logs out of session manager 202, all active sessions can then be suspended 810 by session manager 202 (as shown and described in FIG. 3A).

At some subsequent time in the future, the user may create a new session on a webpage 812 that is associated with the same particular domain name on browser 302 without previously logging in or authenticating with session manager 202. If a subsequent attempt to log into session manager 202 is attempted (as shown and described in FIG. 2A), session manager 202 may detect a conflict 814 between the new session and the previously suspended session associated with that domain name. In an embodiment, the user may then determine whether to override the newly created session with the suspended session or alternatively maintain the newly created session 816. Alternatively, a user may retrieve a previously created session as depicted in FIGS. 2A-2B.

In an example, for on-line banking applications, a user may create new session on a banking website 818 via browser 302, and session manager 202 may periodically "tickle" the banking server by sending a non-session modifying request 820 to keep the session on banking website alive. Thus, an active session may be maintained in situations where the session would typically be timed out after a short period of inactivity.

In one embodiments, a user may create a first session A on a multi-account website 822 such as, but not limited to, Google®, among other readily apparent arrangements (GOOGLE is a registered trademark of Google Inc.). The user may then subsequently create a second session B on that same multi-account website 824. In embodiments, session manager 202 may provide a user interface allowing the user to switch between the separate multi-account sessions 826 in a seamless manner by accessing shared session and without requiring the user to login or logout of multiple different sessions.

Figure 9:
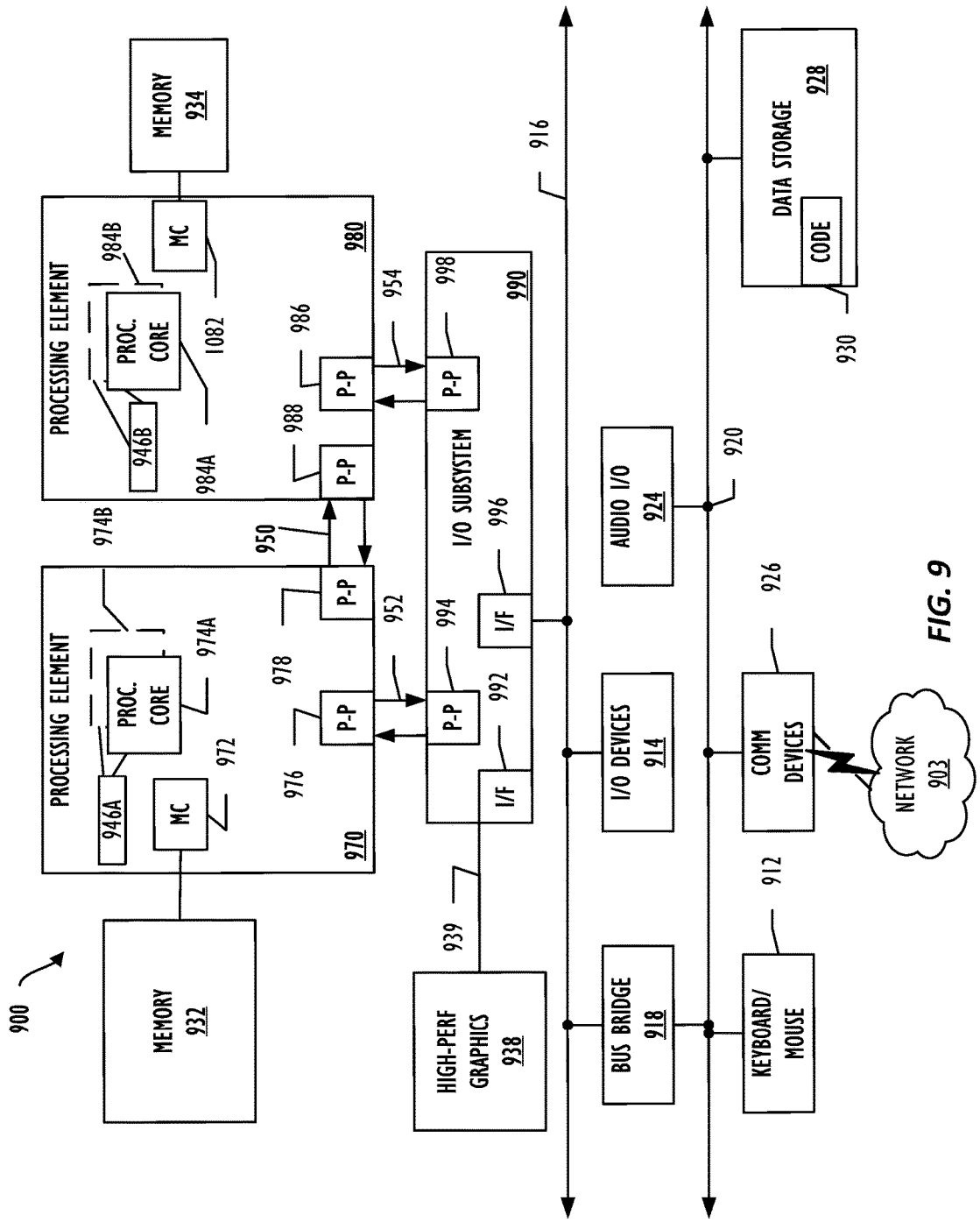
FIG. 9 is a diagram illustrating a computing device for use with techniques described herein according to one embodiment.

Referring now to FIG. 9, a block diagram illustrates a programmable device 900 that may be used with the processes described in FIGS. 1-8 in accordance with one embodiment. The programmable device 900 illustrated in FIG. 9 is a multiprocessor programmable device that includes a first processing element 970 and a second processing element 980. While two processing elements 970 and 980 are shown, an embodiment of programmable device 900 may also include only one such processing element.

Programmable device 900 is illustrated as a point-to-point interconnect system, in which the first processing element 970 and second processing element 980 are coupled via a point-to-point interconnect 950. Any or all of the interconnects illustrated in FIG. 9 may be implemented as a multi-drop bus rather than point-to-point interconnects.

As illustrated in FIG. 9, each of processing elements 970 and 980 may be multicore processors, including first and second processor cores (i.e., processor cores 974*a* and 974*b* and processor cores 984*a* and 984*b*). Such cores 974*a*, 974*b*, 984*a*, 984*b* may be configured to execute instruction code in a manner similar to that discussed above in connection with FIGS. 1-8. However, other embodiments may use processing elements that are single core processors as desired. In embodiments with multiple processing elements 970, 980, each processing element may be implemented with different numbers of cores as desired.

Each processing element 970, 980 may include at least one shared cache 946. The shared cache 946*a*, 946*b* may store data (e.g., instructions) that are utilized by one or more components of the processing element, such as the cores 974*a*, 974*b* and 984*a*, 984*b*, respectively. For example, the shared cache may locally cache data stored in a memory 932, 934 for faster access by components of the processing elements 970, 980. In one or more embodiments, the shared cache 946a, 946b may include one or more mid-level caches, such as level 2 (L2), level 3 (L3), level 4 (L4), or other levels of cache, a last level cache (LLC), or combinations thereof.

While FIG. 9 illustrates a programmable device with two processing elements 970, 980 for clarity of the drawing, the scope of the invention is not so limited and any number of processing elements may be present. Alternatively, one or more of processing elements 970, 980 may be an element other than a processor, such as an graphics processing unit (GPU), a digital signal processing (DSP) unit, a field programmable gate array, or any other programmable processing element. Processing element 980 may be heterogeneous or asymmetric to processing element 970. There may be a variety of differences between processing elements 970, 980 in terms of a spectrum of metrics of merit including architectural, microarchitectural, thermal, power consumption characteristics and the like. These differences may effectively manifest themselves as asymmetry and heterogeneity amongst processing elements 970, 980. In some embodiments, the various processing elements 970, 980 may reside in the same die package.

First processing element 970 may further include memory controller logic (MC) 972 and point-to-point (P-P) interconnects 976 and 978. Similarly, second processing element 980 may include a MC 982 and P-P interconnects 986 and 988. As illustrated in FIG. 9, MCs 972 and 982 couple processing elements 970, 980 to respective memories, namely a memory 932 and a memory 934, which may be portions of main memory locally attached to the respective processors. While MC logic 972 and 982 is illustrated as integrated into processing elements 970, 980, in some embodiments the memory controller logic may be discrete logic outside processing elements 970, 980 rather than integrated therein.

Processing element 970 and processing element 980 may be coupled to an I/O subsystem 990 via respective P-P interconnects 976 and 986 through links 952 and 954. As illustrated in FIG. 9, I/O subsystem 990 includes P-P interconnects 994 and 998. Furthermore, I/O subsystem 990 includes an interface 992 to couple I/O subsystem 990 with a high performance graphics engine 938. In one embodiment, a bus (not shown) may be used to couple graphics engine 938 to I/O subsystem 990. Alternately, a point-to-point interconnect 939 may couple these components.

In turn, I/O subsystem 990 may be coupled to a first link 916 via an interface 996. In one embodiment, first link 916 may be a Peripheral Component Interconnect (PCI) bus, or a bus such as a PCI Express bus or another I/O interconnect bus, although the scope of the invention is not so limited.

As illustrated in FIG. 9, various I/O devices 914, 924 may be coupled to first link 916, along with a bridge 918 which may couple first link 916 to a second link 920. In one embodiment, second link 920 may be a low pin count (LPC) bus. Various devices may be coupled to second link 920 including, for example, a keyboard/mouse 912, communication device(s) 926 (which may in turn be in communication with the computer network 903), and a data storage unit 928 such as a disk drive or other mass storage device which may include code 930, in one embodiment. The code 930 may include instructions for performing embodiments of one or more of the techniques described above. Further, an audio I/O 924 may be coupled to second bus 920.

Note that other embodiments are contemplated. For example, instead of the point-to-point architecture of FIG. 9, a system may implement a multi-drop bus or another such communication topology. Although links 916 and 920 are illustrated as busses in FIG. 9, any desired type of link may be used. Also, the elements of FIG. 9 may alternatively be partitioned using more or fewer integrated chips than illustrated in FIG. 9.

Figure 10:
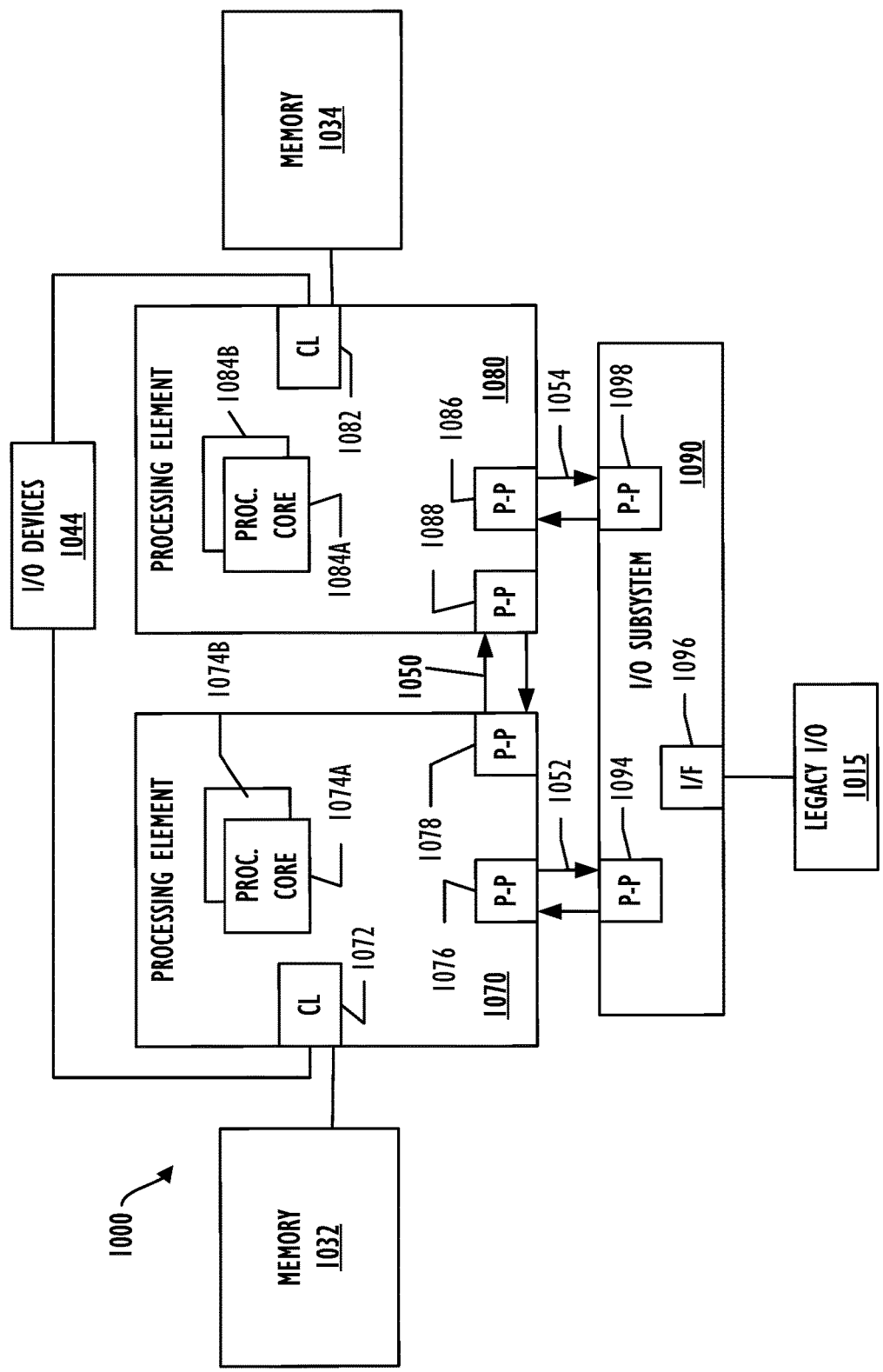
FIG. 10 is a block diagram illustrating a computing device for use with techniques described herein according to another embodiment.

Referring now to FIG. 10, a block diagram illustrates a programmable device 1000 according to another embodiment. Certain aspects of FIG. 9 have been omitted from FIG. 10 in order to avoid obscuring other aspects of FIG. 10.

FIG. 10 illustrates that processing elements 1070, 1080 may include integrated memory and I/O control logic ("CL") 1072 and 1082, respectively. In some embodiments, the 1072, 1082 may include memory control logic (MC) such as that described above in connection with FIG. 9. In addition, CL 1072, 1082 may also include I/O control logic. FIG. 10 illustrates that not only may the memories 1032, 1034 be coupled to the 1072, 1082 but also that I/O devices 1044 may also be coupled to the control logic 1072, 1082. Legacy I/O devices 1015 may be coupled to the I/O subsystem 1090 by interface 1096. Each processing element 1070, 1080 may include multiple processor cores, illustrated in FIG. 10 as processor cores 1074A, 1074B, 1084A and 1084B. As illustrated in FIG. 10, I/O subsystem 1090 includes P-P interconnects 1094 and 1098 that connect to P-P interconnects 1076 and 1086 of the processing elements 1070 and 1080 with links 1052 and 1054. Processing elements 1070 and 1080 may also be interconnected by link 1050 and interconnects 1078 and 1088, respectively.

The programmable devices depicted in FIGS. 9 and 10 are schematic illustrations of embodiments of programmable devices which may be utilized to implement various embodiments discussed herein. Various components of the programmable devices depicted in FIGS. 9 and 10 may be combined in a system-on-a-chip (SoC) architecture.

Referring now to FIG. 11, an example infrastructure 1100 in which the techniques described above may be implemented is illustrated schematically. Infrastructure 1100 contains computer networks 1102. Computer networks 1102 may include many different types of computer networks available today, such as the Internet, a corporate network or a Local Area Network (LAN). Each of these networks can contain wired or wireless programmable devices and operate using any number of network protocols (e.g., TCP/IP). Networks 1102 may be connected to gateways and routers (represented by 1108), end user computers 1106, and computer servers 1104. Infrastructure 1100 also includes cellular network 1103 for use with mobile communication devices. Mobile cellular networks support mobile phones and many other types of mobile devices. Mobile devices in the infrastructure 1100 are illustrated as mobile phones 1110, laptops 1112 and tablets 1114. A mobile device such as mobile phone 1110 may interact with one or more mobile provider networks as the mobile device moves, typically interacting with a plurality of mobile network towers 1120, 1130, and 1140 for connecting to the cellular network 1103. Although referred to as a cellular network in FIG. 11, a mobile device may interact with towers of more than one provider network, as well as with multiple non-cellular devices such as wireless access points and routers 1108. In addition, the mobile devices 1110, 1112 and 1114 may interact with non-mobile devices such as computers 1104 and 1106 for desired services, which may include sharing sessions across multiple client devices and with other authorized users without providing user credentials described above. The functionality of client devices may be implemented in any device or combination of devices illustrated in FIG. 11; however, most commonly is implemented in a firewall or intrusion protection system in a gateway or router.

The following examples pertain to further embodiments.

Example 1 is a machine readable medium, on which are stored instructions, comprising instructions that when executed cause a machine to: transmit user information related to creating a session on a web browser for a web page associated with a web domain, wherein the user information includes user credentials; transmit logout information related to terminating the session, thereby creating a terminated session; transmit a request to retrieve the terminated session; and receive session information related to injecting the terminated session in the web browser, thereby creating an active session.

In Example 2, the subject matter of Example 1 can optionally include, wherein the instructions to transmit logout information further comprise instructions that when executed cause the machine to: store session data related to the session responsive to transmitting the logout information; and delete session cookies relates to the session from the web browser.

In Example 3, the subject matter of Example 1 or 2 can optionally include, wherein the instructions further comprise instructions that when executed cause the machine to create the session on the web browser associated with a mobile device.

In Example 4, the subject matter of Examples 1 to 3 can optionally include, wherein the instructions further comprise instructions that when executed cause the machine to transmit information related to sharing the session with a second user, thereby creating a shared session.

In Example 5, the subject matter of Example 4 can optionally include, wherein the instructions to share the session further comprise instructions that when executed cause the machine to transmit restrictions for the shared session related to the second user.

In Example 6, the subject matter of Examples 1 to 5 can optionally include, wherein the instructions further comprise instructions that when executed cause the machine to prevent one or more of a username and a password from being transmitted responsive to transmitting the request to retrieve the terminated session.

In Example 7, the subject matter of Examples 1 to 6 can optionally include, wherein the instructions further comprise instructions that when executed cause the machine to transmit a request to the web domain or modifying the session information to keep the session alive, the request being a non-session modifying request.

In Example 8, the subject matter of Examples 1 to 7 can optionally include, wherein the instructions to receive session information related to retrieving the terminated session further comprise instructions that when executed cause the machine to determine if a previous session exists for the web page associated with the web domain.

In Example 9, the subject matter of Examples 1 to 6 can optionally include, wherein the instructions further comprise instructions that when executed cause the machine to terminate the session on a first device and retrieve the terminated session on a second device, the first and second devices being associated with a user.

Example 10 is a method for restoring and sharing a session, comprising: transmitting user information related to creating a session on a web browser for a web page associated with a web domain, wherein the user information includes user credentials; transmitting logout information from a session manager related to terminating the session, thereby creating a terminated session; transmitting a request to retrieve the terminated session with the session manager; and receiving session information with the session manager related to injecting the terminated session in the web browser, thereby creating an active session.

In Example 11, the subject matter of Example 10 can optionally include storing web browser data related to the session responsive to transmitting the logout information; and deleting session cookies relates to the session from the web browser.

In Example 12, the subject matter of Examples 10 to 11 can optionally include creating the session on the web browser associated with a mobile device.

In Example 13, the subject matter of Examples 10 to 12 can optionally include transmitting information related to sharing the session with a second user, thereby creating a shared session.

In Example 14, the subject matter of Examples 10 to 13 can optionally include preventing the user credentials from being transmitted responsive to transmitting the request to retrieve the terminated session, wherein the user credentials includes at least one of a username and a password of a user.

In Example 15, the subject matter of Examples 10 to 14 can optionally include transmitting a request to the web domain to keep the session alive Example 16 is a method for restoring and sharing a session, comprising: transmitting user information related to creating a session on a web browser for a web page associated with a web domain, wherein the user information includes user credentials; transmitting logout information from a session manager related to terminating the session, thereby creating a terminated session; transmitting a request to retrieve the terminated session with the session manager; and receiving session information with the session manager related to injecting the terminated session in the web browser, thereby creating an active session.

In Example 17, the subject matter of Example 16 can optionally include storing web browser data related to the session responsive to transmitting the logout information; and deleting session cookies relates to the session from the web browser.

In Example 18, the subject matter of Examples 16 to 17 can optionally include creating the session on the web browser associated with a mobile device.

In Example 19, the subject matter of Examples 16 to 17 can optionally include transmitting information related to sharing the session with a second user, thereby creating a shared session.

In Example 20, the subject matter of Example 19 can optionally include transmitting restrictions for the shared session related to the second user.

In Example 21, the subject matter of Examples 16 to 17 can optionally include preventing the user credentials from being transmitted responsive to transmitting the request to retrieve the terminated session, wherein the user credentials includes at least one of a username and a password of a user.

In Example 22, the subject matter of Examples 16 to 17 can optionally include transmitting a request to the web domain to keep the session alive, the request being a non-session modifying request.

In Example 23, the subject matter of Examples 16 to 17 can optionally include determining whether a previous session exists for the web page associated with the web domain.

In Example 24, the subject matter of Examples 16 to 17 can optionally include terminating the session on a first device and retrieving the terminated session on a second device, the first and second devices being associated with the user.

Example 25 is a computer system for restoring and sharing a session, comprising: one or more processors; and a memory coupled to the one or more processors, on which are stored instructions, comprising instructions that when executed cause one or more of the processors to: transmit user information related to creating a session on a web browser for a web page associated with a web domain, wherein the user information includes user credentials; transmit logout information from a session manager related to terminating the session, thereby creating a terminated session; transmit a request to retrieve the terminated session with the session manager; and receive session information with the session manager related to injecting the terminated session in the web browser, thereby creating an active.

In Example 26, the subject matter of Example 25 can optionally include, wherein the instructions to transmit logout information further comprise instructions that when executed cause the one or more processors to: store session data related to the session responsive to transmitting the logout information; and delete session cookies relates to the session from the web browser.

In Example 27, the subject matter of Examples 25 to 26 can optionally include, wherein the instructions further comprise instructions that when executed cause the one or more processors to create the session on the web browser associated with a mobile device.

In Example 28, the subject matter of Examples 25 to 26 can optionally include, wherein the instructions further comprise instructions that when executed cause the one or more processors to transmit information related to sharing the session with a second user, thereby creating a shared session.

In Example 29, the subject matter of Example 28 can optionally include, wherein the instructions to share the session further comprise instructions that when executed cause the one or more processors to transmit restrictions for the shared session related to the second user.

In Example 30, the subject matter of Examples 25 to 26 can optionally include, wherein the instructions further comprise instructions that when executed cause the one or more processors to prevent the user credentials from being transmitted responsive to transmitting the request to retrieve the terminated session.

In Example 31, the subject matter of Examples 25 to 26 can optionally include, wherein the instructions further comprise instructions that when executed cause the one or more processors to transmit a request to the web domain to keep the session alive, the request being a non-session modifying request.

Example 32 is a method for sharing a session, comprising: transmitting authentication information related to authenticating a user on a server; transmitting a request to create a shared session with a second user; receiving an encryption key for encrypting the shared session, wherein the encryption key being associated with the second user; encrypting the shared session to create an encrypted session responsive to receiving the encryption key; and transmitting the encrypted session to the server responsive to creating the encrypted session.

In Example 33, the subject matter of Example 32 can optionally include transmitting restrictions for the shared session related to the second user.

In Example 34, the subject matter of Example 33 can optionally include receiving the server public key responsive to transmitting restrictions for the shared session.

In Example 35, the subject matter of Examples 32 to 33 can optionally include, further comprising restricting the second user from accessing cookies or modifying code in the shared session responsive to transmitting the restrictions for the shared session.

Example 36 is a computer system for restoring and sharing a session, comprising: one or more processors; and a memory coupled to the one or more processors, on which are stored instructions, comprising instructions that when executed cause one or more of the processors to: transmit authentication information related to authenticating a user on a server; transmit a request to create a shared session with a second user; receive an encryption key for encrypting the shared session, wherein the encryption key being associated with the second user; encrypt the shared session to create an encrypted session responsive to receiving the encryption key; and transmit the encrypted session to the server responsive to creating the encrypted session.

In Example 37, the subject matter of Example 36 can optionally include, wherein the instructions further comprise instructions that when executed cause the one or more processors to transmit restrictions for the shared session related to the second user.

In Example 38, the subject matter of Example 37 can optionally include, wherein the instructions further comprise instructions that when executed cause the one or more processors to receiving the server public key responsive to transmitting restrictions for the shared session.

In Example 39, the subject matter of Examples 36 to 37 can optionally include, wherein the instructions further comprise instructions that when executed cause the one or more processors to restricting the second user from accessing cookies or modifying code in the shared session responsive to transmitting the restrictions for the shared session.

In Example 40, the subject matter of Examples 36 to 37 can optionally include, wherein the instructions further comprise instructions that when executed cause the one or more processors to transmit the request from a mobile device associated with the user.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable medium comprising instructions that when executed cause at least one machine to at least:
   transmit user information to create a first active session on a web browser of a first device for a web page associated with a web domain, wherein the user information includes user credentials;
   obtain shared session information from a second device, the shared session information encrypted using a public key to create, from the first active session, a locked shared session with the second device;
   transmit logout information to terminate the locked shared session to create a terminated session, an indication of the terminated session to persist after termination;
   transmit a request to retrieve the terminated session using the public key without the user credentials; and
   obtain session information to inject the terminated session in the web browser to create a second active session.

2. The machine readable medium of claim 1, wherein the instructions cause the at least one machine to:

store session data related to the locked shared session responsive to transmitting the logout information; and
delete session cookies related to the locked shared session from the web browser.

3. The machine readable medium of claim 1, wherein the first device includes a mobile device.

4. The machine readable medium of claim 1, wherein the instructions cause the at least one machine to transmit restrictions for the shared session to the second device.

5. The machine readable medium of claim 1, wherein the instructions cause the at least one machine to prevent the user credentials from being transmitted after the request to retrieve the terminated session has been transmitted, wherein the user credentials includes at least one of a username and a password of a user.

6. The machine readable medium of claim 1, wherein the instructions cause the at least one machine to transmit a request to the web domain to at least one of: (i) keep the locked shared session alive or (ii) modify the session information to keep the locked shared session alive, the request being a non-session modifying request.

7. The machine readable medium of claim 1, wherein the instructions cause the at least one machine to determine if a previous session exists for the web page associated with the web domain.

8. The machine readable medium of claim 1, wherein the instructions cause the at least one machine to terminate the locked shared session on the first device and retrieve the terminated session on the second device, the first and second devices being associated with a user.

9. A method for restoring and sharing a session, comprising:
transmitting user information to create a first active session on a web browser of a first device for a web page associated with a web domain, wherein the user information includes user credentials;
accessing shared session information from a second device, the shared session information encrypted using a public key to create, from the first active session, a locked shared session with the second device;
transmitting logout information to transform the locked shared session into a terminated session;
transmitting a request to retrieve the terminated session using the public key without the user credentials; and
accessing session information to inject the terminated session in the web browser to create a second active session.

10. The method of claim 9, further including:
storing session data related to the locked shared session responsive to transmitting the logout information; and
deleting session cookies related to the locked shared session from the web browser.

11. The method of claim 9, wherein the first device includes a mobile device.

12. The method of claim 9, further including transmitting restrictions for the shared session to the second user.

13. The method of claim 9, further including preventing the user credentials from being transmitted after transmitting the request to retrieve the terminated session, wherein the user credentials includes at least one of a username and a password of a user.

14. The method of claim 9, further including transmitting a request to the web domain to keep the locked shared session alive, the request being a non-session modifying request.

15. The method of claim 9, further including determining whether a previous session exists for the web page associated with the web domain.

16. The method of claim 9, further including terminating the locked shared session on a first device and retrieving the terminated session on a second device, the first and second devices being associated with the user.

17. A first device comprising:
one or more processors; and
a memory including instructions that, when executed, cause the one or more of processors to:
access user information to create a first active session on a web browser of the first device for a web page associated with a web domain, wherein the user information includes user credentials;
access shared session information from a second device, the shared session information encrypted using a public key to create, from the first active session, a locked shared session with the second device;
transmit logout information to transform the locked shared session into a terminated session;
transmit a request to retrieve the terminated session using the public key without the user credentials; and
access session information to inject the terminated session in the web browser to create a second active session.

18. The first device of claim 17, wherein the one or more processors are to:
store session data related to the locked shared session responsive to transmitting the logout information; and
delete session cookies related to the locked shared session from the web browser.

19. The first device of claim 17, wherein the one or more processors are to transmit restrictions for the shared session related to the second device.

20. The first device of claim 17, wherein the one or more processors are to prevent the user credentials from being transmitted responsive to transmitting the request to retrieve the terminated session, wherein the user credentials includes at least one of a username and a password of a user.

21. The first device of claim 17, wherein the one or more processors are to transmit a request to the web domain to keep the locked shared session alive, the request being a non-session modifying request.

* * * * *